(12) United States Patent
Khalifa

(10) Patent No.: US 8,020,318 B2
(45) Date of Patent: Sep. 20, 2011

(54) QUICK-ASSEMBLY FOOTWEAR

(75) Inventor: Aly Khalifa, Raleigh, NC (US)

(73) Assignee: Gamila Company, Raleigh, NC (US)

( * ) Notice: Subject to any disclaimer, the term of this patent is extended or adjusted under 35 U.S.C. 154(b) by 912 days.

(21) Appl. No.: 12/008,442

(22) Filed: Jan. 11, 2008

(65) Prior Publication Data
US 2008/0168684 A1 Jul. 17, 2008

Related U.S. Application Data

(60) Provisional application No. 60/884,465, filed on Jan. 11, 2007, provisional application No. 60/954,964, filed on Aug. 9, 2007.

(51) Int. Cl.
*A43B 3/24* (2006.01)
*A43B 13/14* (2006.01)
(52) U.S. Cl. .......... 36/100; 36/101; 36/103; 36/28; 36/11.5
(58) Field of Classification Search .......... 36/100, 36/101, 103, 28, 11.5, 15, 30 R
See application file for complete search history.

(56) References Cited

U.S. PATENT DOCUMENTS

| | | | | |
|---|---|---|---|---|
| 4,887,369 A * | 12/1989 | Bailey et al. | | 36/101 |
| 4,974,344 A * | 12/1990 | Ching | | 36/101 |
| 6,023,859 A * | 2/2000 | Burke et al. | | 36/105 |
| 6,581,303 B1 | 6/2003 | Tuan | | |
| 7,334,350 B2 * | 2/2008 | Ellis, III | | 36/25 R |
| 7,644,517 B2 * | 1/2010 | Gerber | | 36/11.5 |
| 7,698,834 B1 * | 4/2010 | Courville | | 36/15 |
| 7,793,429 B2 * | 9/2010 | Ellis, III | | 36/25 R |
| 7,908,772 B2 * | 3/2011 | Celia | | 36/100 |
| 2003/0089000 A1 | 5/2003 | Tseng | | |
| 2004/0255486 A1 * | 12/2004 | Pawlus et al. | | 36/10 |
| 2005/0034332 A1 * | 2/2005 | Moschel et al. | | 36/101 |

FOREIGN PATENT DOCUMENTS
KR  2000-0002441 U  2/2000
KR  2002-0007262 A  1/2002

* cited by examiner

*Primary Examiner* — Ted Kavanaugh
(74) *Attorney, Agent, or Firm* — Peter D. Aufrichtig; McCarthy Fingar LLP

(57) ABSTRACT

Melded footwear and process for manufacture of footwear. This enhanced shoe can be formed and assembled with a limited number of steps and without the need for much stitching. The shoe has a durable polyurethane shell, which is an integrated upper and outsole. The shoe contains a textile upper portion which is attached by direct injection molded. Molding the textile to the outsole eliminates the need for the use of adhesives. A locking plug element is provided that serves the dual function of providing cushioning around the heel and locking certain elements together.

10 Claims, 47 Drawing Sheets

QUICK-ASSEMBLY FOOTWEAR

CROSS-REFERENCE TO RELATED APPLICATIONS

This application claims the priority of provisional application Ser. No. 60/884,465 filed in the United States Patent and Trademark Office on Jan. 11, 2007 and from provisional application Ser. No. 60/954,964 filed in the United States Patent and Trademark Office on Aug. 9, 2007.

BACKGROUND OF THE INVENTION

The invention is generally directed to a shoe and method of manufacturing a shoe which significantly reduces the labor involved in manufacturing.

Generally, shoes are very labor intensive products to manufacture, requiring relatively skilled labor and significant manual activity to assemble the last of the shoe, as well as the body and sole. As a result, manufacture of shoes has shifted almost completely to low cost production areas apart from extremely high end shoes where consumers can pay for the highly skilled artisans who make high quality shoes.

As consumers have evolved in their desires for both fashion conscious shoes and shoes that fit their particular feet more precisely and comfortably, there has been a need for high quality shoes which can be partially or completely custom fit to the customer's specifications in a timely fashion. Generally, with shoe production remote from the United States or other first world markets, any orders for shoes take a significant period of time to be manufactured and then shipped to the seller and finally customer in completed form.

Accordingly, there is a need for an improved shoe construction with reduced labor required to allow local manufacturing and enhanced customization of the shoes without significantly affecting the cost, labor involved and time to manufacture and deliver to a customer.

SUMMARY OF THE INVENTION

The invention is generally directed to a melded shoe construction in which the components are assembled without the need for significant labor or skills.

Accordingly, it is an object of the invention to provide an improved melded shoe construction with a reduced or eliminated need for stitching.

Another object of the invention is to provide an improved melded shoe in which a fabric selected by a customer can be incorporated into a shoe without affecting the manufacturing process.

Yet another object of the invention is to provide an improved melded shoe in which ecologically responsible materials can be utilized in the construction of the shoe without sacrificing quality, cost or manufacturing time.

Still yet another object of the invention is to provide an improved melded shoe in which a customer's foot measurements can be rapidly converted into a shoe which can be manufactured to the customer's exact foot size and shape without delay or significant expense near or at the customer's location.

Yet still a further object of the invention is to provide an improved melded shoe which yields less material waste and allows for easy reuse of some materials.

Yet another object of the invention is to provide a melded footwear which eliminates or reduces the need for stitching in the general assembly of the shoe, thereby decreasing labor cost and the cost of manufacturing.

Still yet a further object of the invention is to provide a melded footwear technology which eliminates extra steps needed in lasting and other manufacturing processes, thereby lowering the cost of manufacturing.

Yet another object of the invention is to provide a melded footwear technology where melding refers to a combination of molding and welding, which allows shoe assembly without adhesives that can emit toxic, volatile chemicals and, in the process, yields a more durable bond.

Still yet a further object of the invention is to provide an improved melded footwear technology which gives a shoe the capability to be disassembled more readily for recycling or composting of component parts once the shoe wearing is complete.

Yet still another object of the invention is to provide a melded footwear technology which eliminates exposure of harmful adhesives to workers manufacturing the footwear.

Another object of the invention is to provide the ability to make shoes at a store level by miniaturizing the manufacturing process and machinery requirements.

Still other objects and advantages of the invention will, in part, be obvious and will, in part, be apparent from the specification.

The invention accordingly comprises the features of construction, combinations of elements and arrangements of parts which will be exemplified in the construction as hereinafter set forth, and the scope of the invention will be indicated in the Claims.

BRIEF DESCRIPTION OF THE DRAWINGS

For a fuller understanding of the invention, reference is made to the following description taken in connection with the accompanying drawings, in which:

FIG. 40(*b*) is a perspective view of the two main assembly pieces of FIG. 40(*a*) loosely assembled;

DETAILED DESCRIPTION OF THE PREFERRED EMBODIMENTS

The invention is generally directed to an enhanced shoe which can be formed and assembled with a limited number of steps and without the need for much or any stitching. The shoe 10, in one embodiment, has a durable polyurethane shell, which is an integrated upper and outsole. The shoe contains a textile upper portion which is attached by direct injection molding. Molding the textile 50 to the outsole 20 eliminates the need for the use of adhesives or stitching here. A locking plug element 70 is provided that serves the dual function of providing cushioning around and under the heel and locking several of elements of the shoe 10 together.

Figure 1:
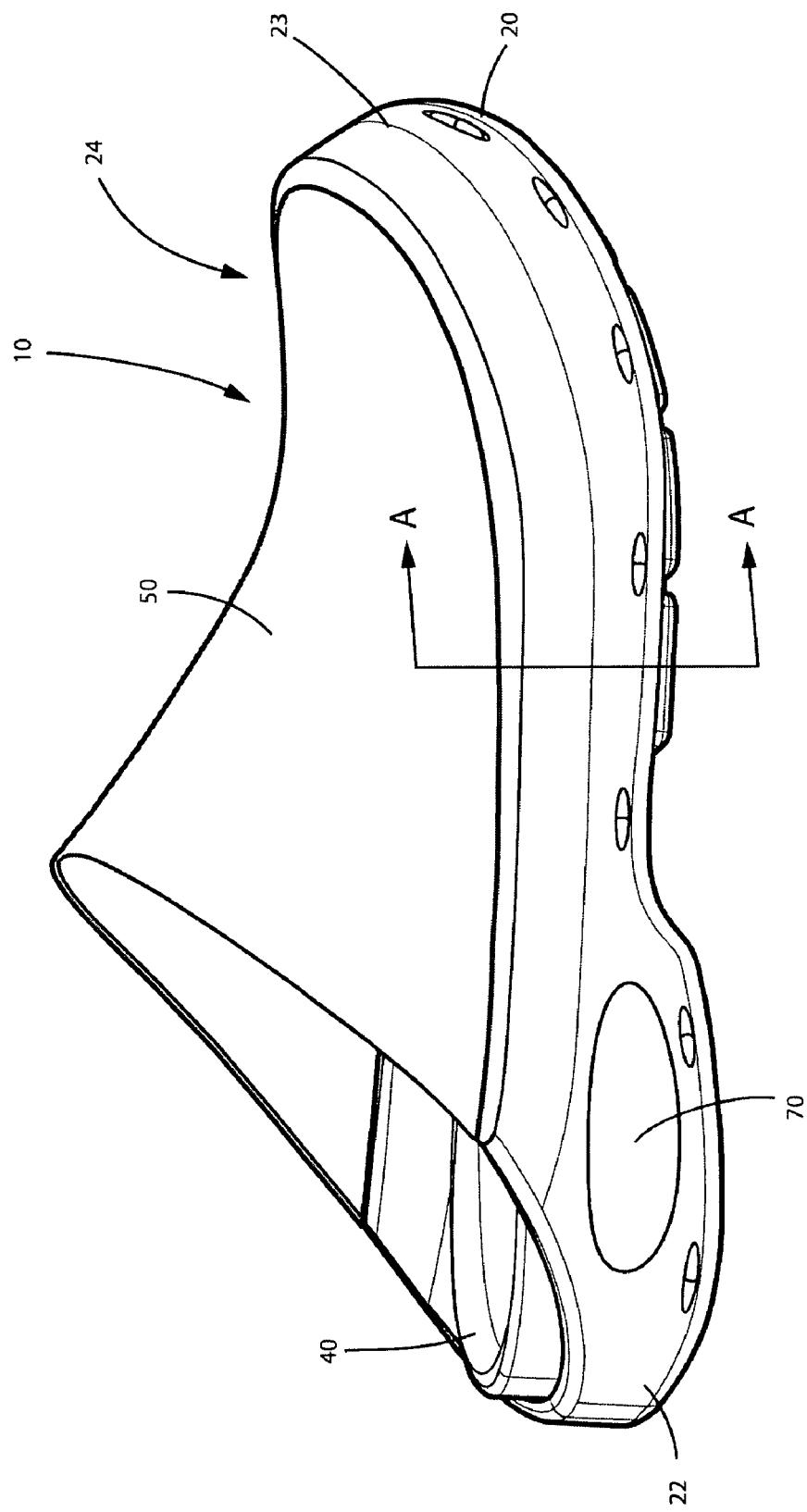
FIG. 1 is a perspective view of the an assembled shoe according to a preferred embodiment of the present invention
Figure 2:
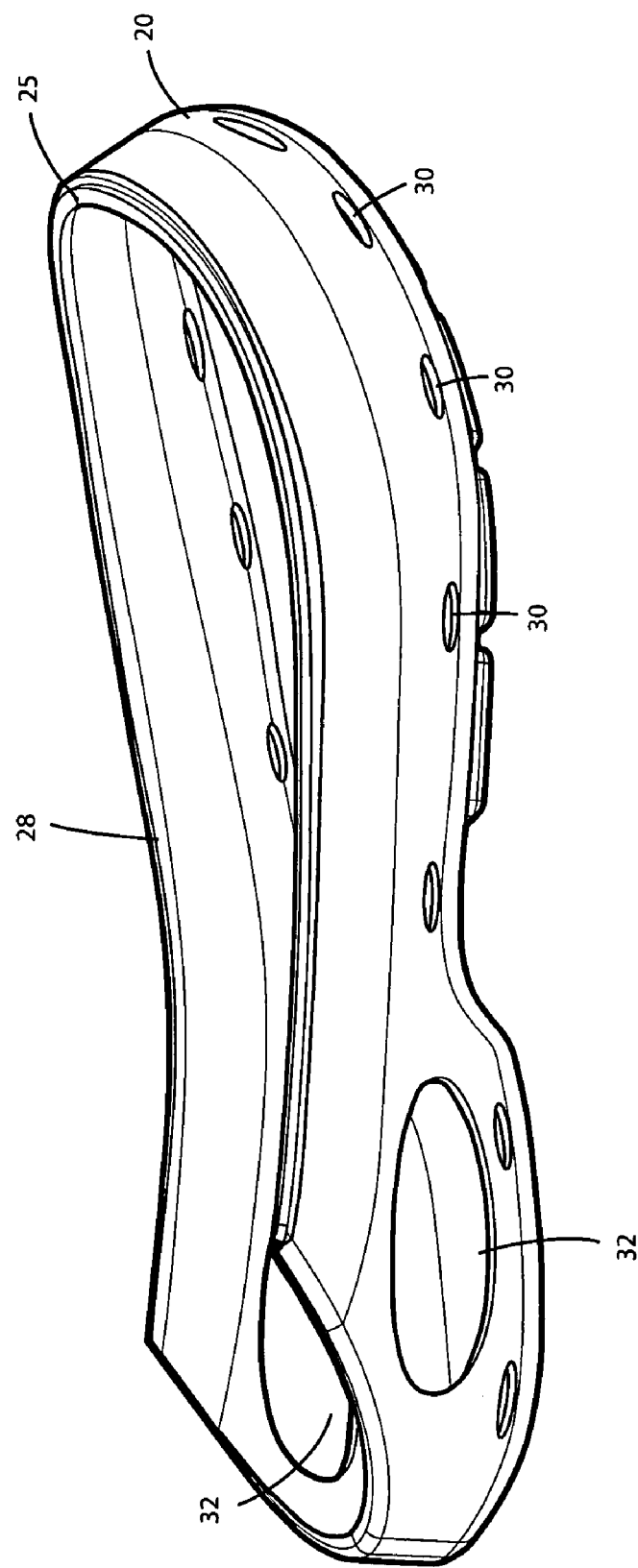
FIG. 2 is a perspective view an outsole portion of the shoe according to the Preferred embodiment shown in FIG. 1.
Figure 3:
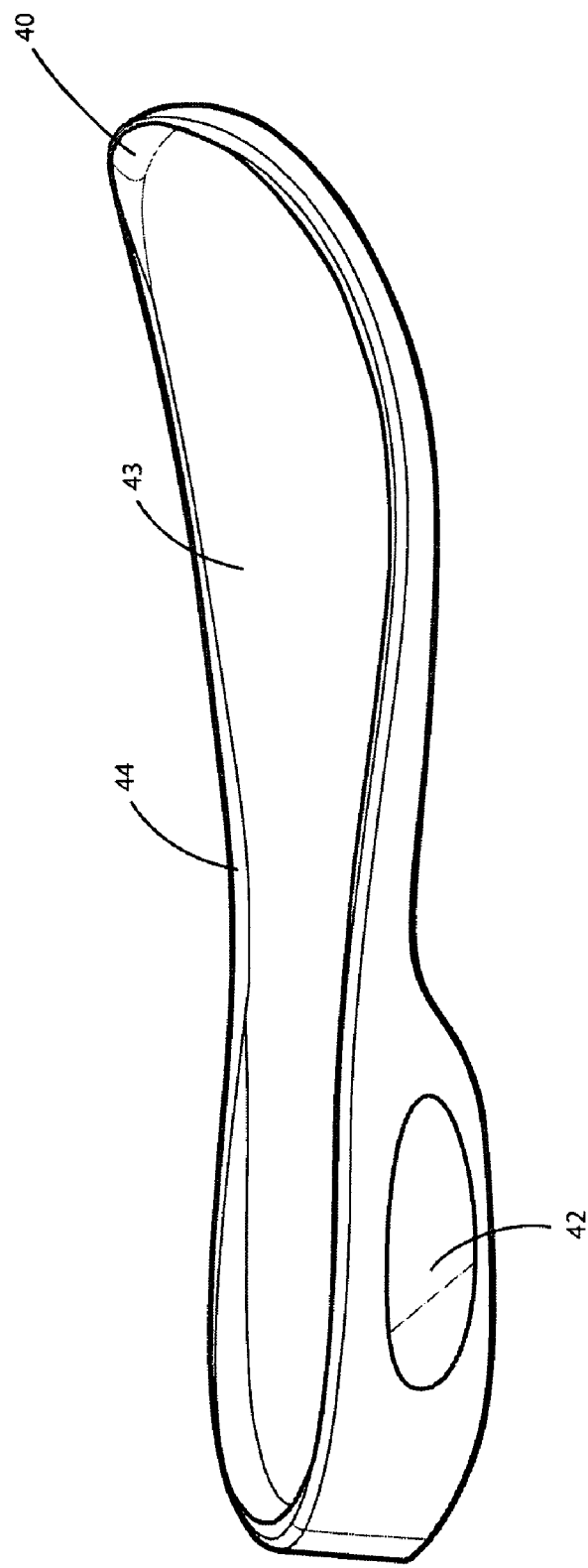
FIG. 3 is a perspective view a footbed insert of the shoe according to the preferred embodiment shown in FIG. 1.
Figure 4:
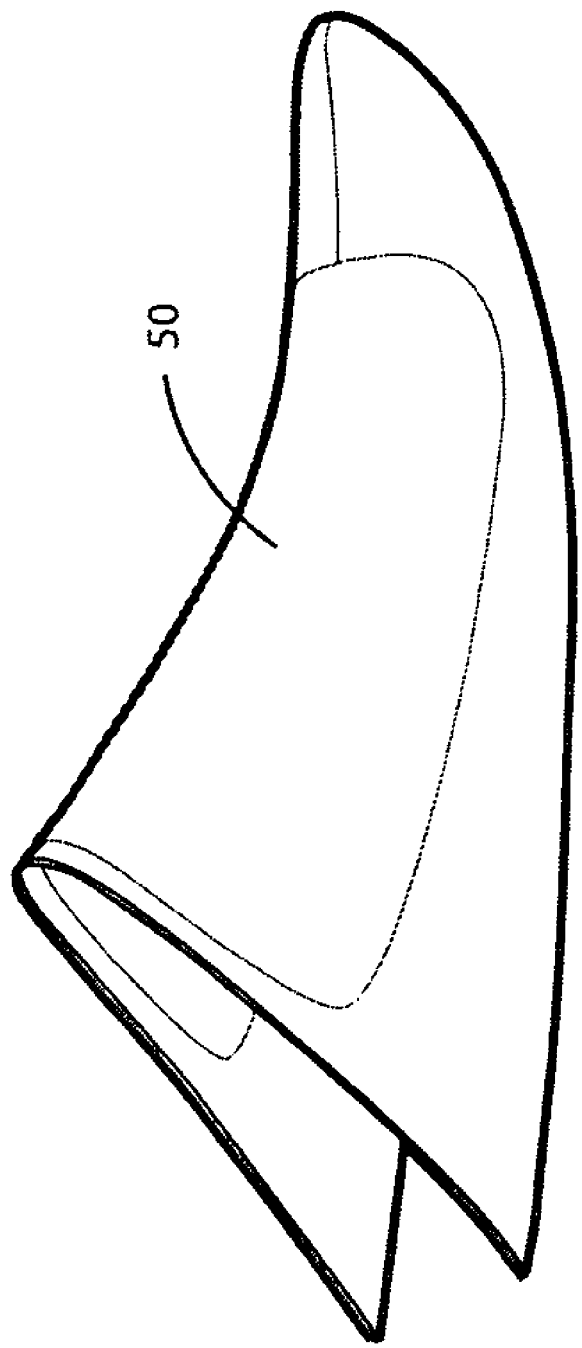
FIG. 4 is a perspective view of a textile portion of the shoe according to the preferred embodiment shown in FIG. 1.
Figure 5:
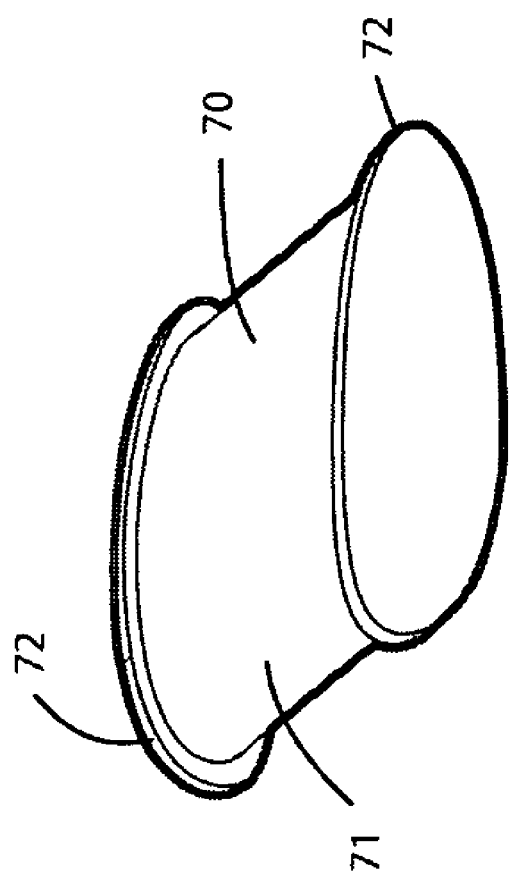
FIG. 5 is a perspective view of a locking plug for the shoe according to the preferred embodiment shown in FIG. 1.
Figure 42:
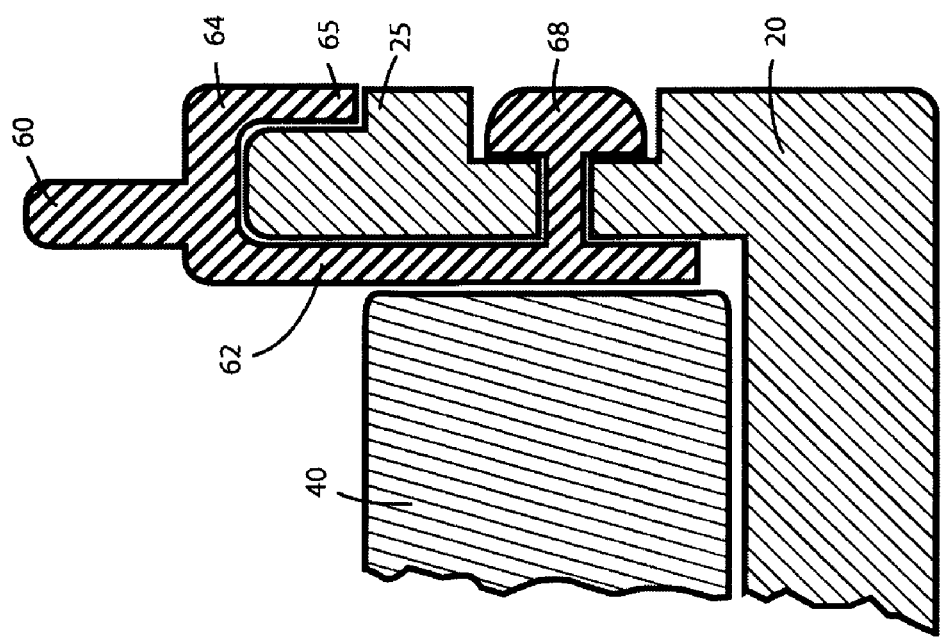
FIG. 42 is a cross sectional view of the perimeter locking strip connection along the lines A-A of FIG. 1.

Reference is first made to FIGS. 1-6, which show a shoe 10 according to a preferred embodiment of the present invention. Shoe 10 contains an outsole portion 20, footbed insert 40 and a textile fabric material 50. Outsole 20 comprises a heel end 22, a toe end 23 and an upper side 24. As seen in FIG. 2 and FIG. 42, outsole 20 contains a channel 25 that extends around the circumference of the outsole at its upper side. Outsole 20 also contains receiving openings 30 and two heel openings 32. As seen in FIG. 3, footbed insert 40 also contains a heel opening 42. Footbed insert 40 has an inner foot supporting surface 43 and a rim 44 extending around the perimeter of surface 43. When placed together, the heel openings of the outsole 32 and the footbed 42 align to form an open channel across the heel of the shoe 10. Textile fabric material 50 forms the top portion on the shoe and is placed over the upper end edge 28 of the outsole 20. This material can be altered to change the look and style of the shoe.

For additional support and locking of the shoe together as well as heel cushioning, a locking plug 70 is used to lock the outsole 20, foot bed insert 40 and locking strip 60 together when it is inserted through heel openings 32 and 42. Locking plug 70 is generally oval in cross section with a central portion 71 and flanges 72.

Figure 6:
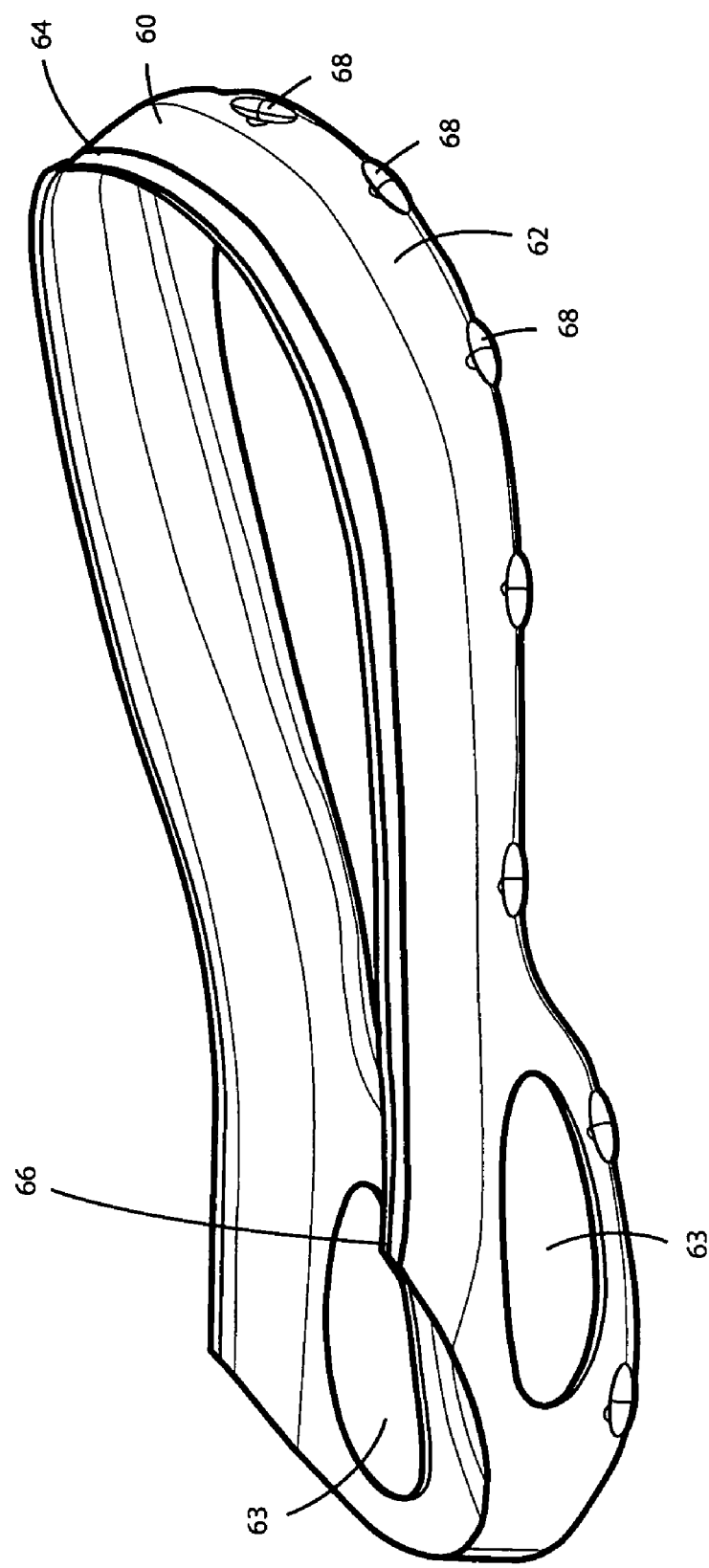
FIG. 6 is a perspective view of the perimeter locking mechanism for the shoe according to the preferred embodiment shown in FIG. 1.

The shoe is further held together by a perimeter locking strip 60 as shown in FIG. 6 and in cross section FIG. 42. Perimeter locking strip 60 is essentially a strip of material similar in shape to outsole 20 and when assembled sits inside outsole 20. It is placed along the inner perimeter of the outsole and has a cross section shaped similar to a tuning fork (as shown in FIG. 42) with one arm 62 being longer than the other arm 64 and contains a base end 66. Base end 66 extends up towards the top of the foot and is attached to textile material 50 by either stitching or molding. Arm 62 extends down along the interior of the outsole and arm 64 extends over the exterior of the outsole. Arm 62 contains a series of perpendicular protrusions 68 that are placed around the circumference of the locking strip for lock fitting to the outsole 20 by being inserted through receiving openings 30 on the inside of outsole 20. Arm 64 contains a locking ridge 65 that snap fits together with channel 25 around the perimeter of outsole 20 and locking strip 60. Arm 62 also contains two heel openings 63 for alignment to the heel openings of the outsole 32 and the footbed 42.

Figure 7:
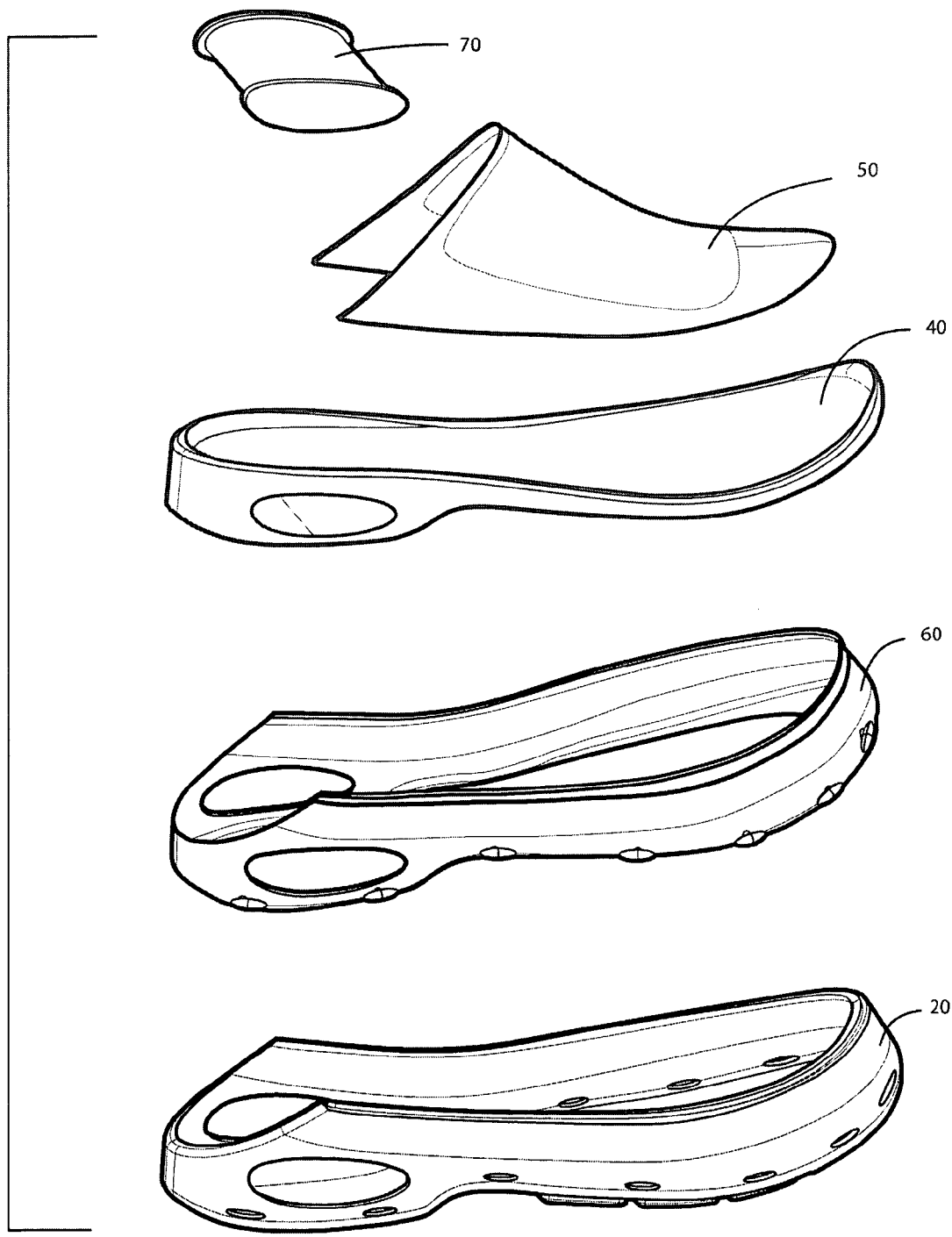
FIG. 7 is an exploded perspective view of an exploded view of the construction of the shoe according to the embodiment shown in FIG. 1.
Figure 8:
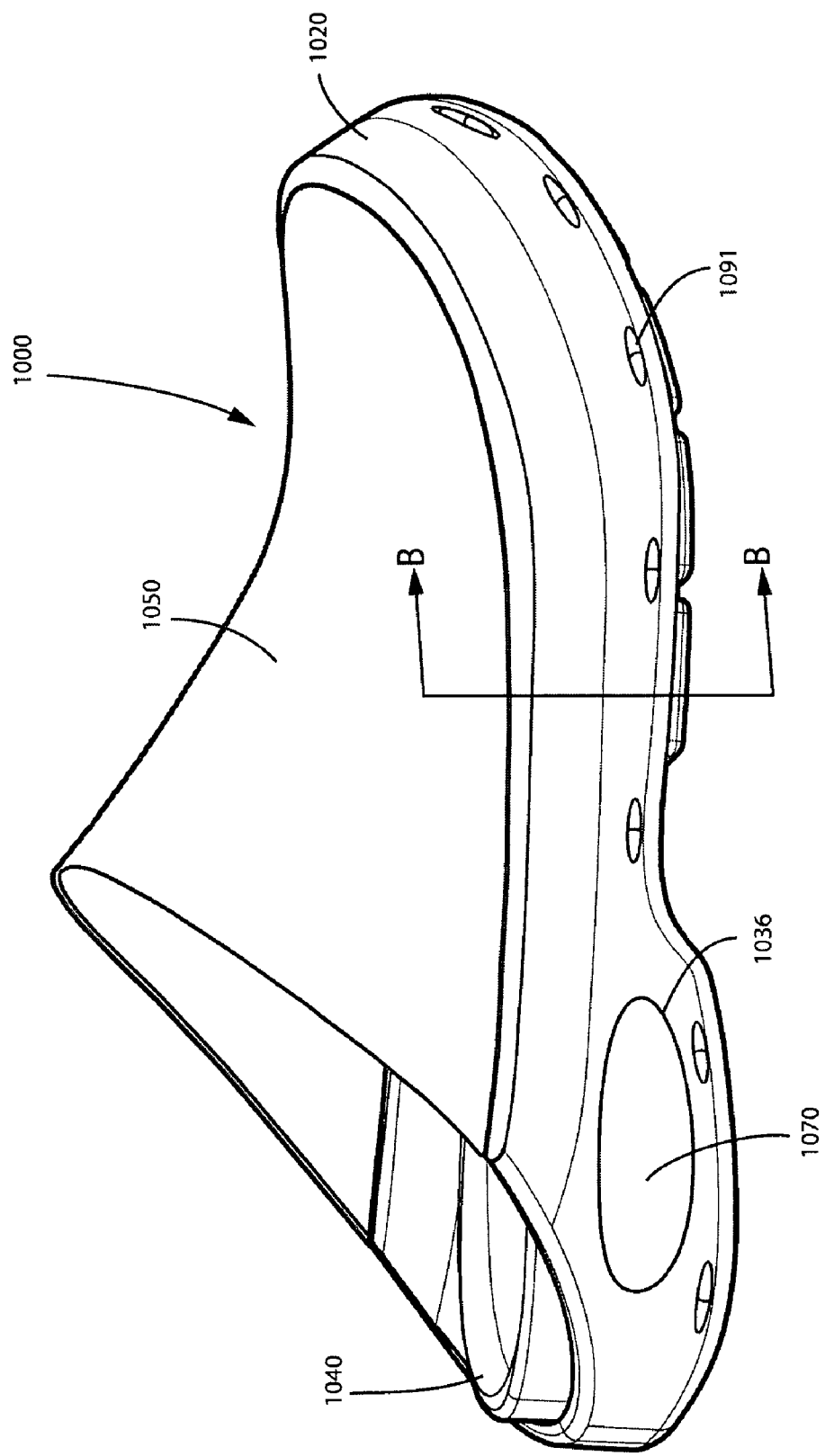
FIG. 8 is a perspective view of the an assembled shoe according to another preferred embodiment of the present invention
Figure 9:
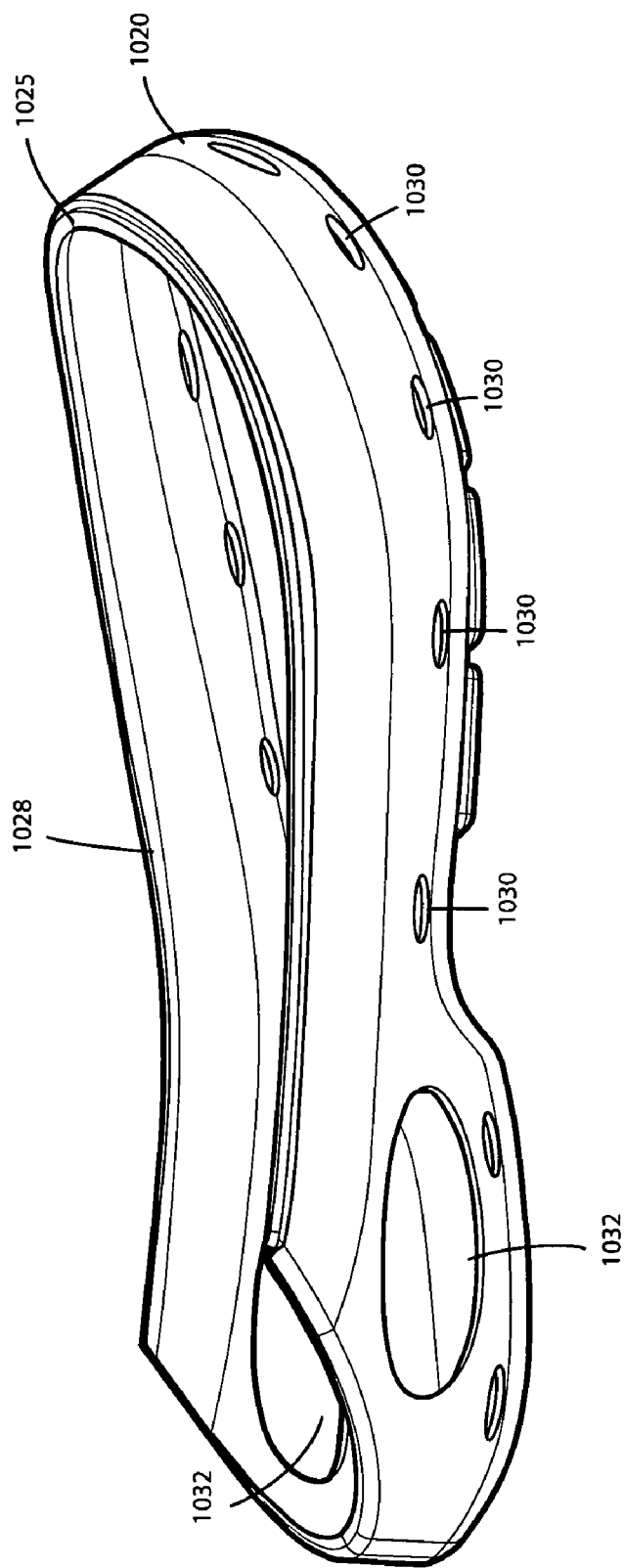
FIG. 9 is a perspective view of an outsole portion of the shoe according to the preferred embodiment shown in FIG. 8.
Figure 10:
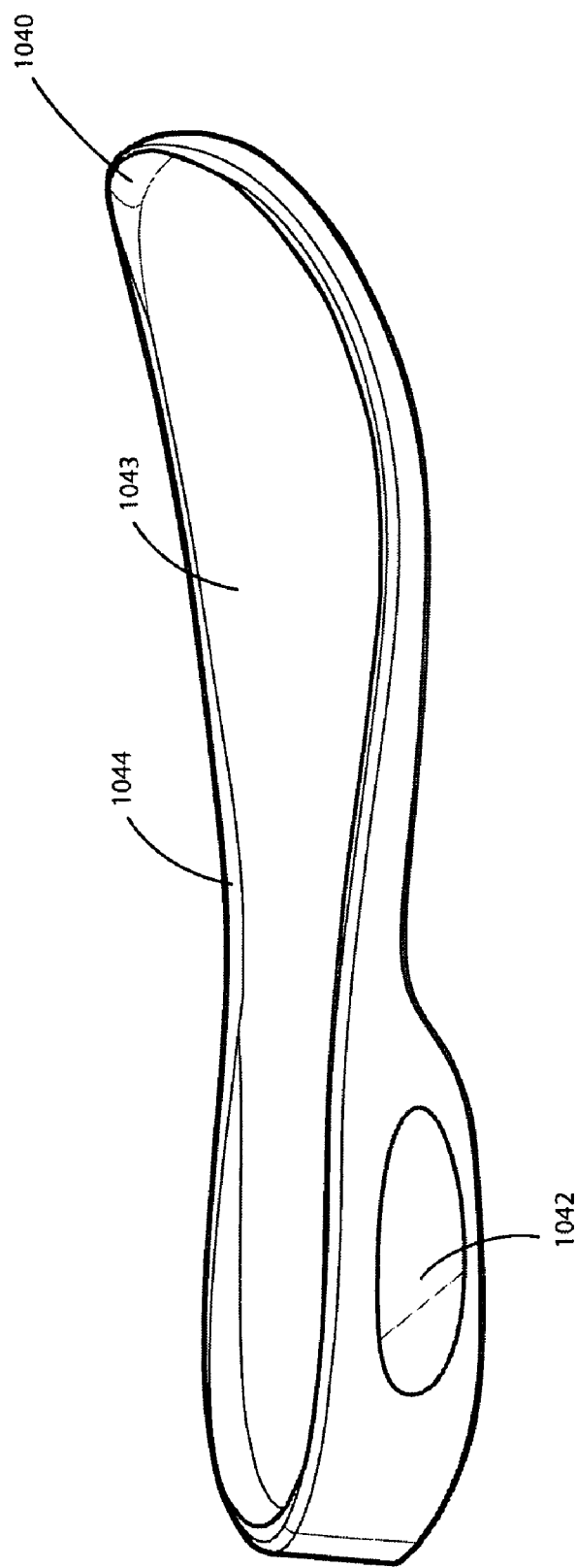
FIG. 10 is a perspective view of a footbed insert of the shoe according to the preferred embodiment shown in FIG. 8.
Figure 11:
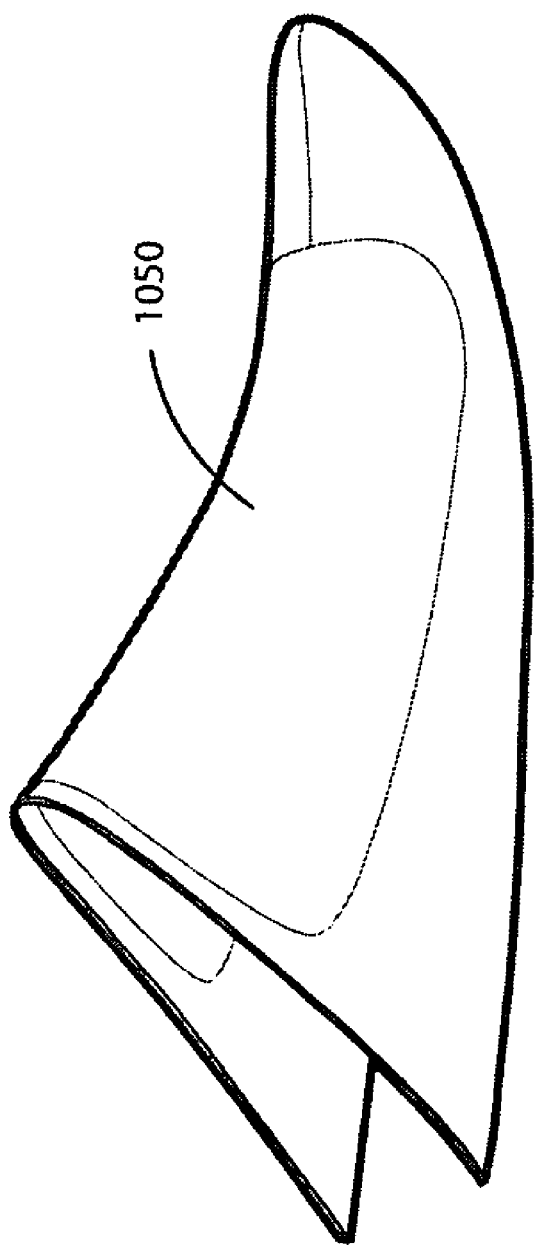
FIG. 11 is a perspective view of a textile portion of the shoe according to the preferred embodiment shown in FIG. 8.
Figure 12:
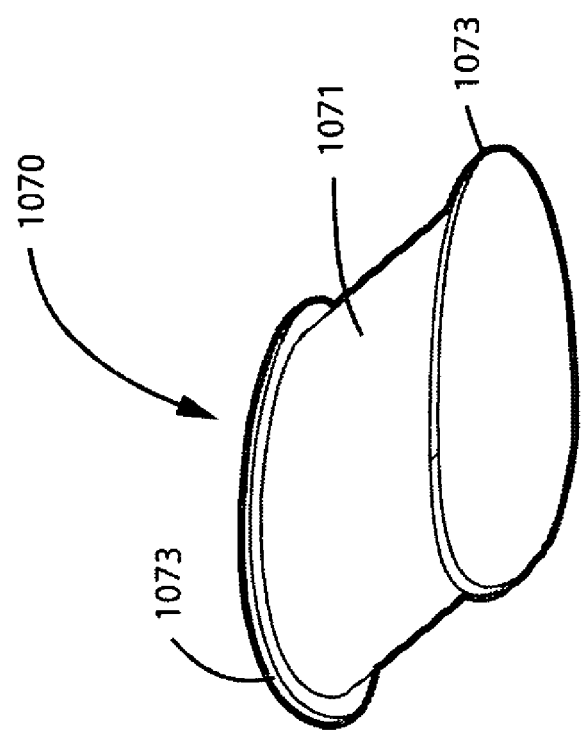
FIG. 12 is a perspective view of a locking plug for the shoe according to the preferred embodiment shown in FIG. 8.

As shown in FIG. 7, the construction of the shoe 10 in accordance with this embodiment is as follows. Outsole 20 is molded to a desired size and shape. Footbed insert 40 is also molded to a desired size and shape. For sizing purposes, footbed insert 40 may be a half size smaller than outsole 20 or the same size so that half sizes can be properly accommodated without the need for a different outsole 20 for each half size thus cutting mold costs. The textile material portion 50 is cut from a desired material and sized to be attached to perimeter locking strip 60 to which it is attached either by welding, melding, gluing or stitching. Perimeter locking strip 60 is then attached to outsole 20 via the snap fit of locking ridge 65 with channel 25 and perpendicular protrusions 68 being fit into receiving openings 30. Locking plug 70 is then inserted through heel openings 32 and 42 to further secure together footbed 40, locking strip 60 and outsole 20 and stabilize the shoe 10. The simple construction of this shoe 10 allows for a quick and easy assembly as well as disassembly for recycling when discarded. In addition to holding the shoe 10 together, the snap fit of the perimeter locking mechanism between outsole 20 and perimeter locking strip 60 provides for resistance to rain from entering the shoe.

Figure 43:
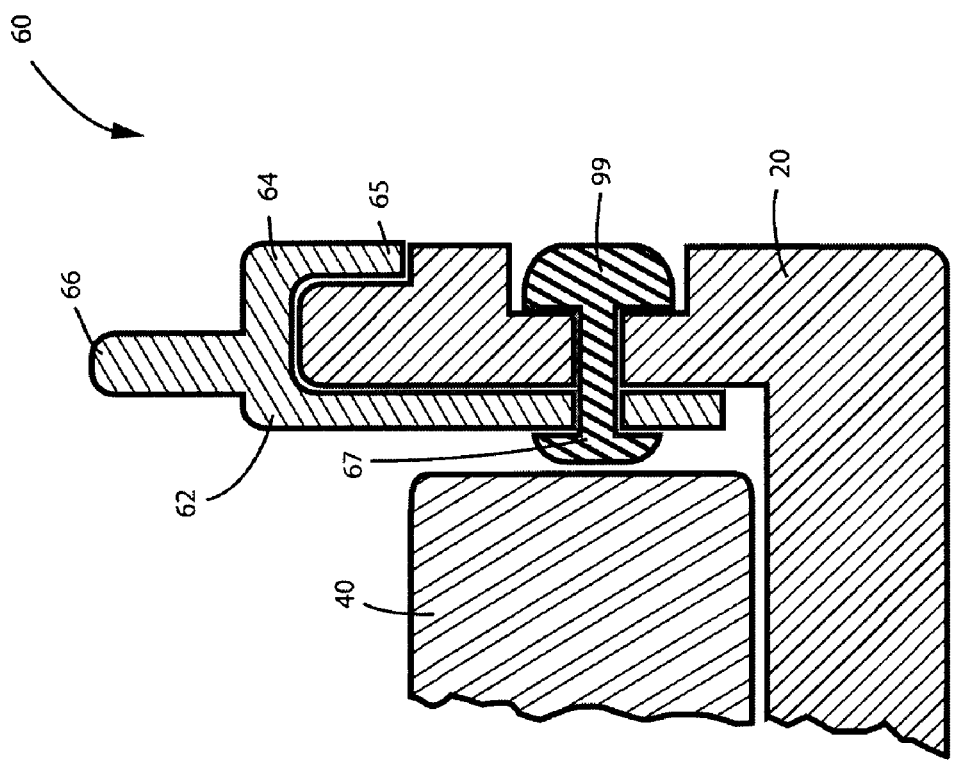
FIG. 43 is a cross sectional view of another embodiment of a perimeter locking strip.

FIG. 43 shows a cross section of another embodiment of the locking strip in which the protrusions 68 are replaced by the use of a series of rivets 99 inserted around the outside perimeter of the locking strip 60 and outsole 20. In this embodiment, locking strip 60 contains a series of receiving holes 67 disposed around its perimeter to accept rivets 99 lining us with receiving openings 30 of outsole 20. Rivets 99 are inserted through the receiving openings outsole 30 and locking strip 67. The use of these rivets 99 makes molding of the locking strip 60 easier, as only a hole needs to be added versus the protruding portions 68. The rivets 99 also provide addition reinforcement and support for the shoe 10.

Figure 13:
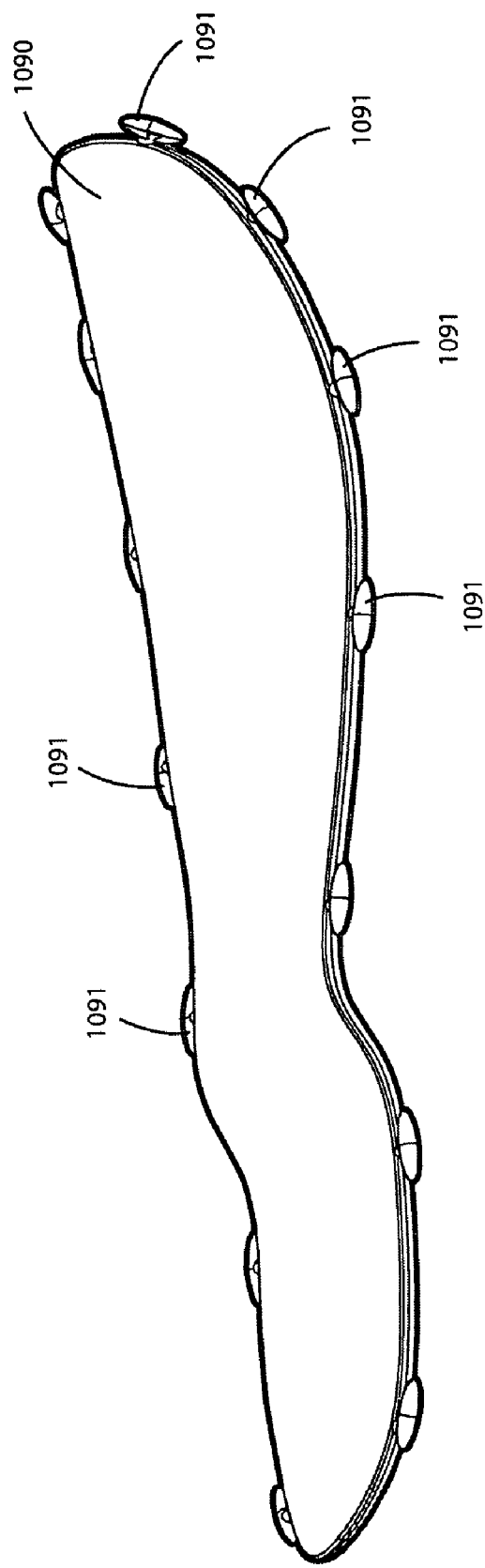
FIG. 13 is a perspective view of a lasting plate for the shoe according to the Preferred embodiment shown in FIG. 8.
Figure 14:
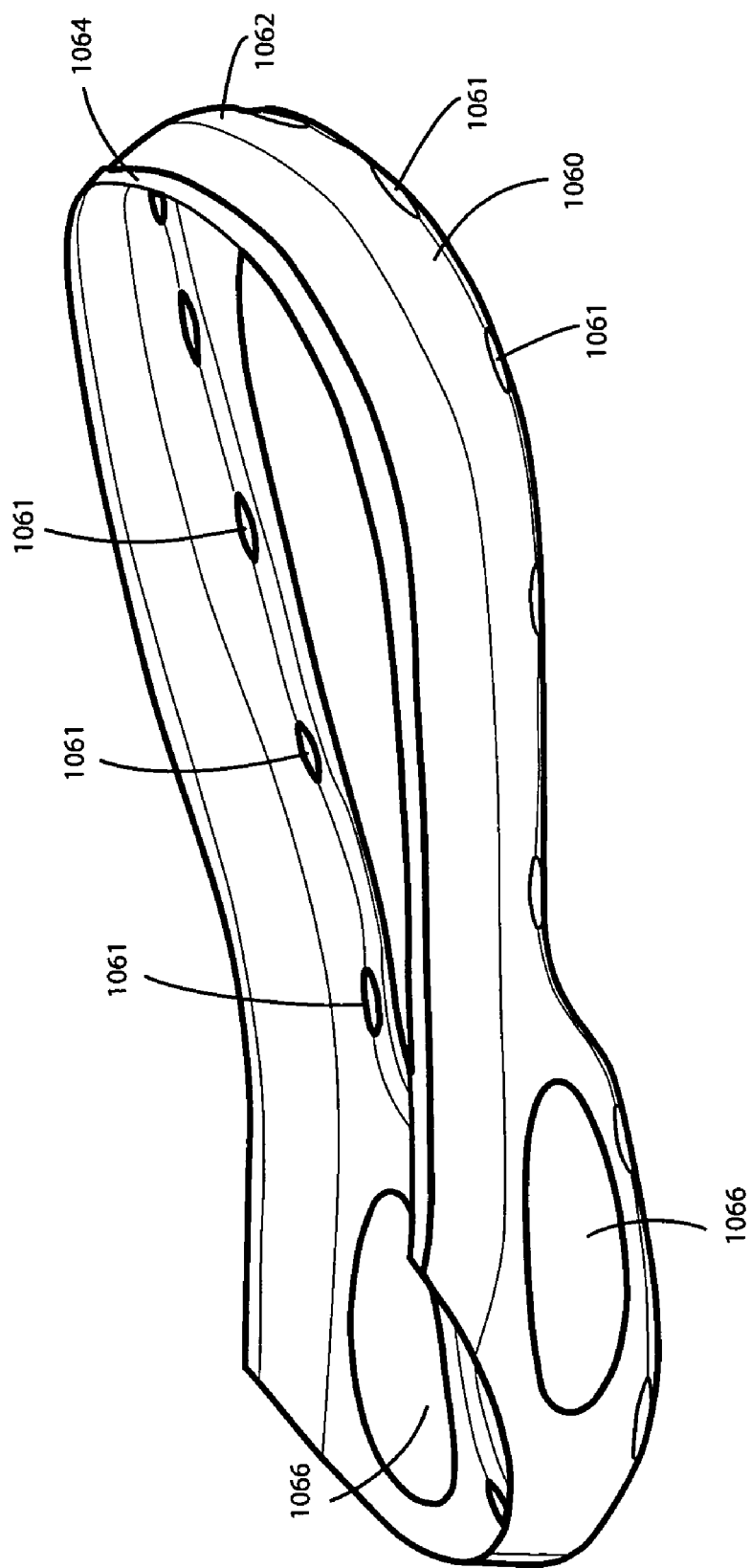
FIG. 14 is a perspective view of the perimeter locking mechanism the shoe according to the preferred embodiment shown in FIG. 8.
Figure 15:
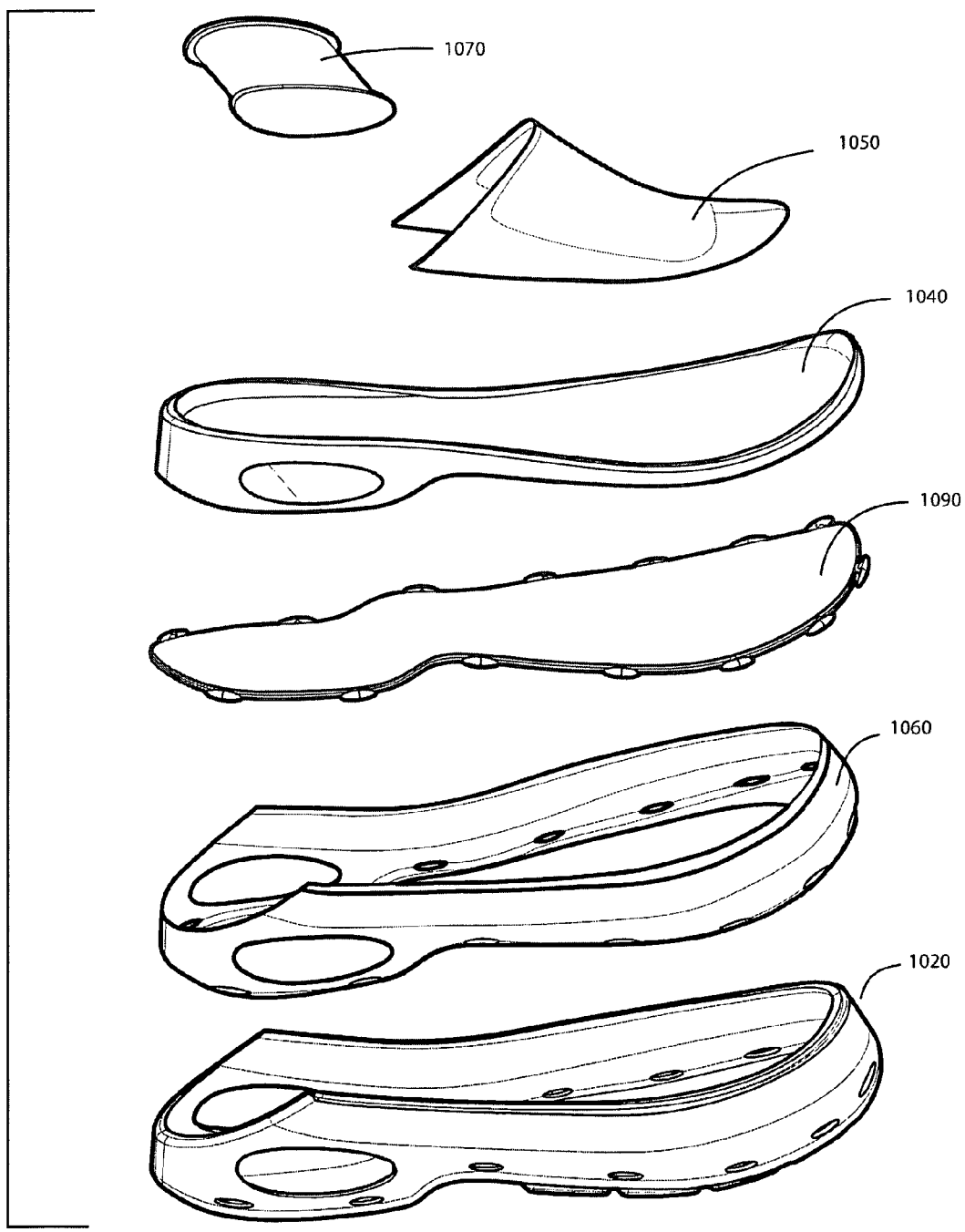
FIG. 15 is an exploded perspective view of the construction of the shoe According to the embodiment shown in FIG. 8.
Figure 16:
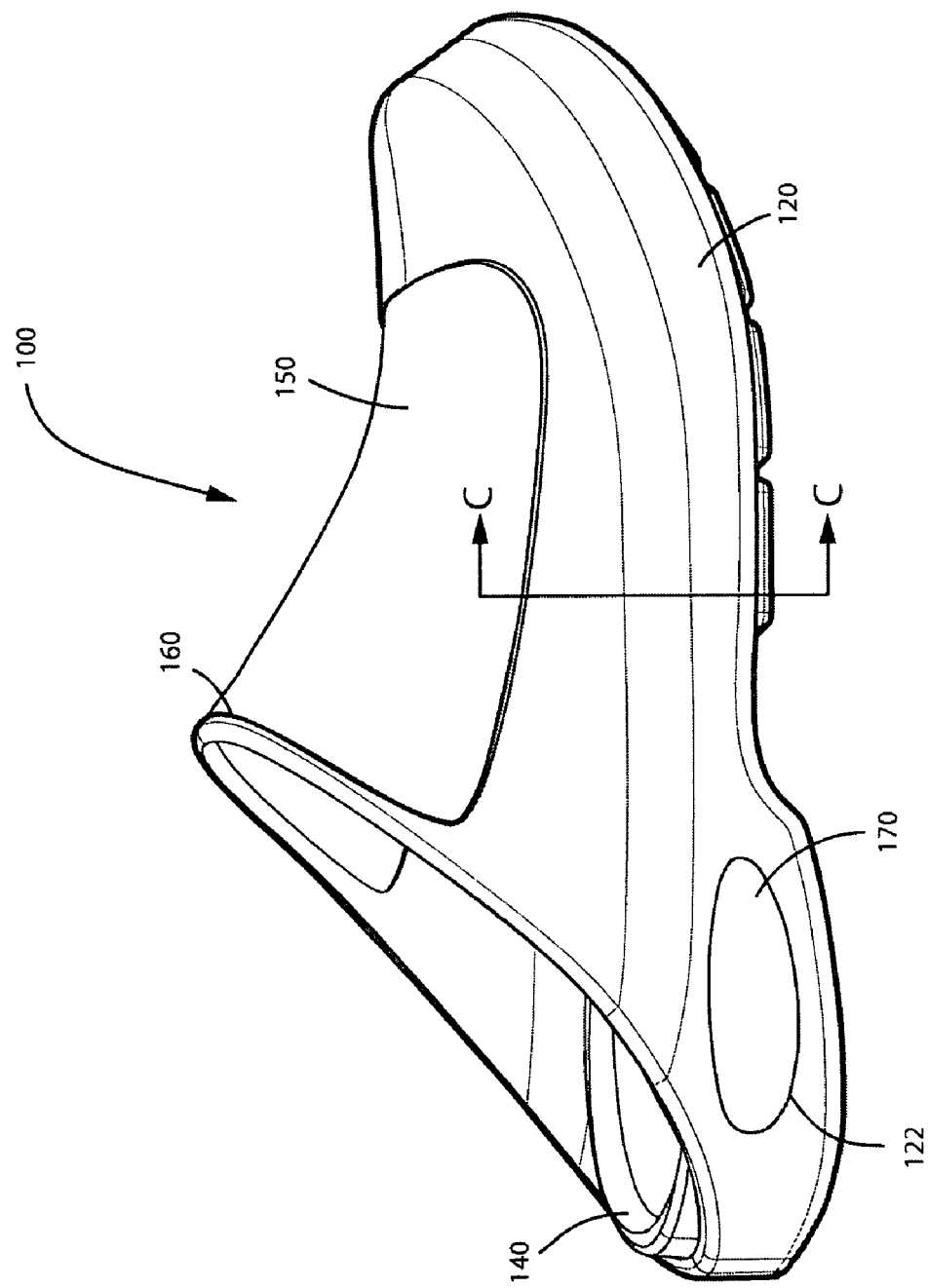
FIG. 16 is a perspective view of the an assembled shoe according to another embodiment of the present invention
Figure 17:
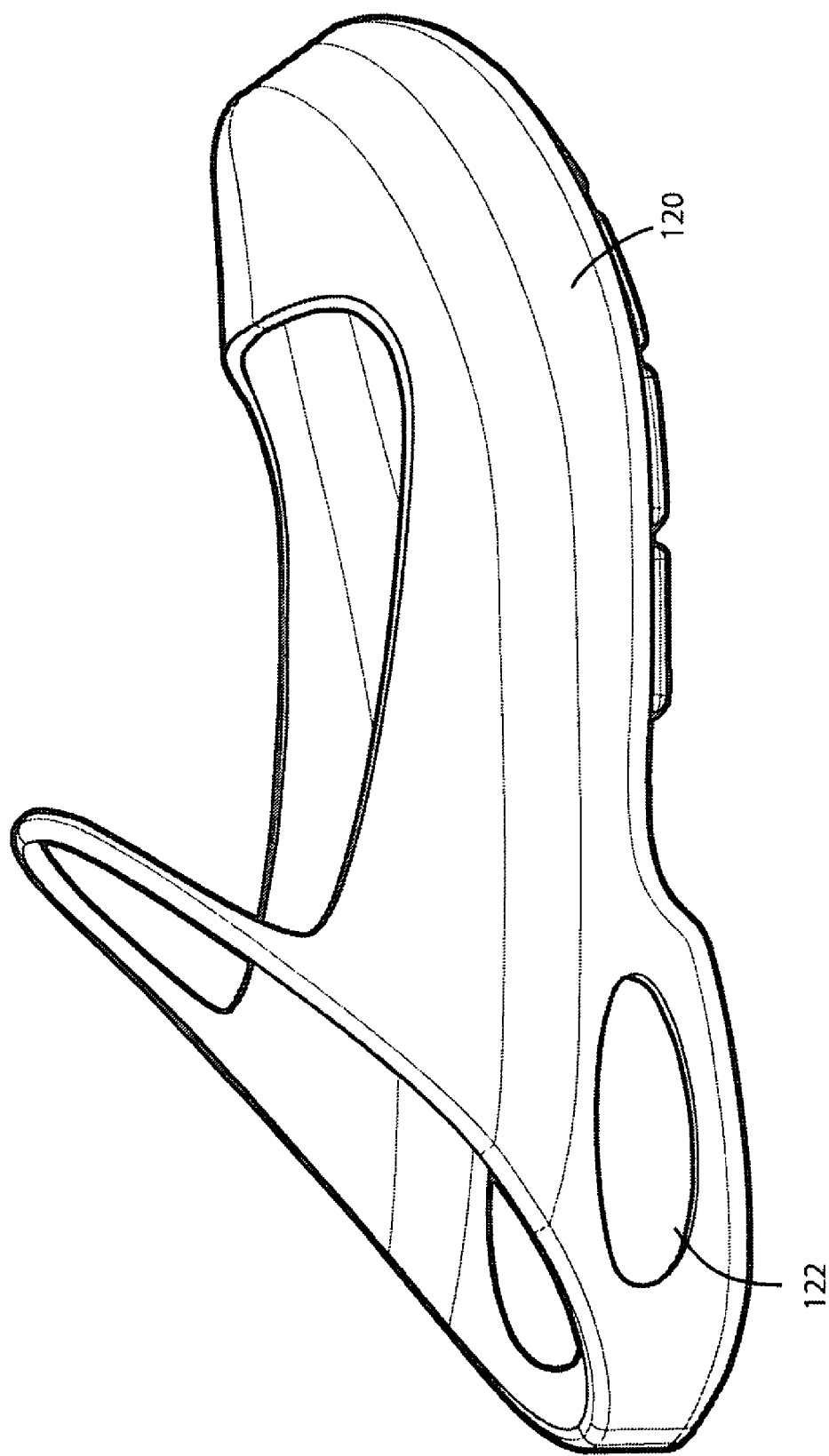
FIG. 17 is a perspective view of s an outsole portion of the shoe according to the embodiment shown in FIG. 16.
Figure 18:
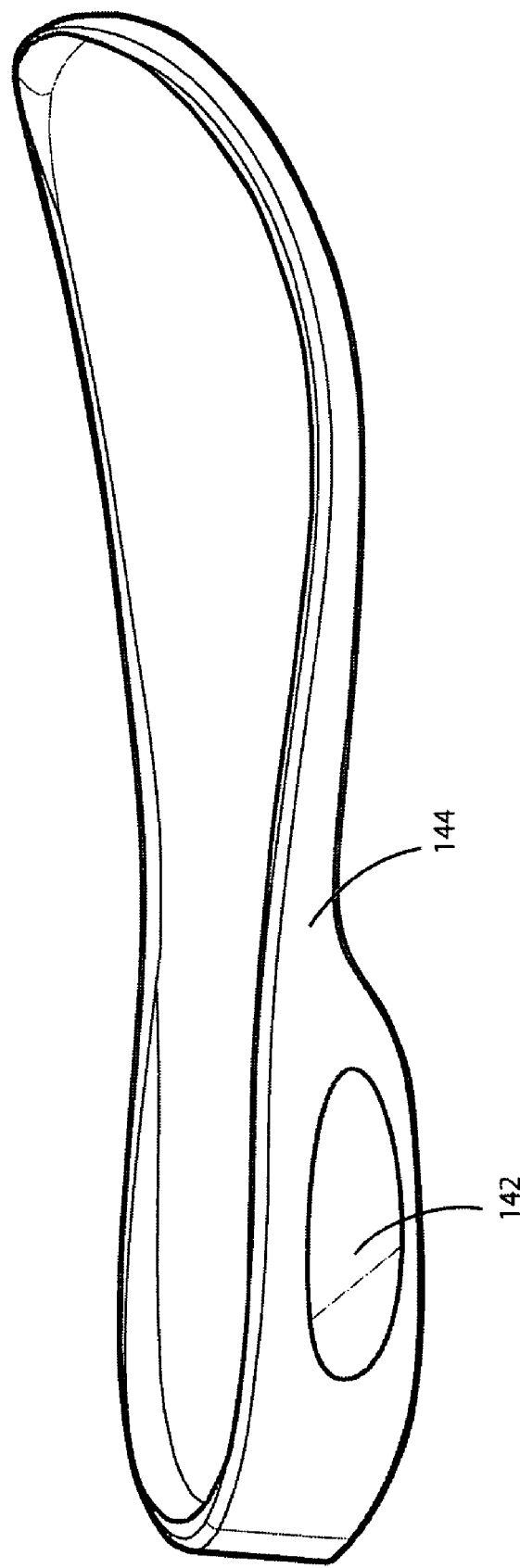
FIG. 18 is a perspective view of a footbed insert of the shoe according to the embodiment shown in FIG. 16.
Figure 44:
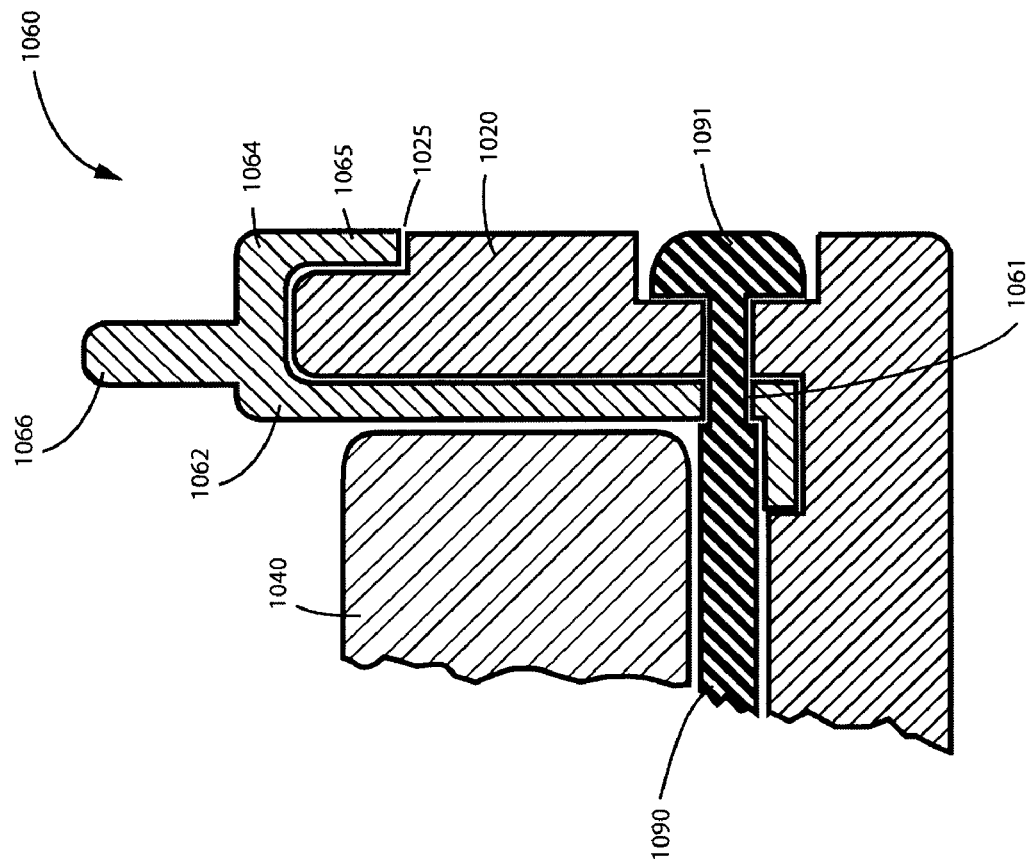
FIG. 44 is a cross sectional view of the perimeter locking strip connection along the lines B-B of FIG. 8.

In another preferred embodiment shown in FIGS. 8-15, the shoe construction is similar to that of FIGS. 1-7 however a lasting board 1090 is placed inside the outsole 1020. However the protrusions could also be made by die-cutting when using a more standard fiber-based lasting board currently used in most shoe construction, provides further support for the wearer's foot as well as stability to the shoe. In this embodiment, as seen in FIG. 15, shoe 1000 contains an outsole portion 1020, footbed insert 1040, lasting board 1090, a textile fabric material 1050, a perimeter locking strip 1060 and locking plug 1070. Outsole 1020 contains a channel 1025 that extends around the circumference of the outsole at its upper end 1028. Footbed insert 1040 has an inner foot supporting surface 1043, a rim 1044 extending around the perimeter of surface 1043. Outsole 1020 also contains receiving openings 1030 and two heel openings 1032. Footbed insert 1040 also contains a heel opening 1042 which extends all the way across the hell portion 1043 of insert 1040. Lasting board 1090 contains a series of protrusions 1061 disposed circumferentially around its perimeter for insertion into the receiving holes 1030 of outsole 1020. As seen in FIG. 13, protrusions 1061 are substantially oval in shape, has a depth of preferably 4-6 mm, a head portion preferably 2 mm wide and a height of preferably of 2-3 mm. Lasting board 1090 provides rigidity to the base of the shoe 1000. Lasting board 1090 is preferably made of a thermoplastic material that can be injection molded to create the protrusions. The material is most preferably recycled a High Density Polyethylene. Textile fabric material 1050 forms the top portion on the shoe and is placed over the upper end edge 1028 of the outsole 1020. Textile material 1050 can be any type of material, but most preferably is a woven material like recycled polyester. and maintains its shape by being cut in a large banana-shaped curve that is attached to the perimeter locking strip 1060. Once the textile 1050 is in that forced shape it will maintain the proper form. Perimeter locking strip 1060, as shown in cross section in FIG. 44, is a strip similar in shape to the outsole 1020 and is placed inside the inner perimeter of the outsole 1020. Locking strip 1060 contains base 1066, arm 1064 and arm 1062. In this embodiment, arm 1062 contains a series of receiving openings 1061 for receiving protrusions 1091 of the lasting board. Perimeter locking strip 1060 also contains two heel openings 1066. Arm 1064 rests in channel 1025 to create a snug fit. A locking plug 1070 is used to lock the outsole 1020 and foot bed insert 1040 together when it is inserted through heel openings 1032 and 1042. The locking plug 1070 is generally oval in shape and central portion 1071 and flanges 1073.

The molded sections, outsole 20 and 1020 and footbed 40 and 1040, are preferably made from a thermoplastic polyurethane material that allows for some flexibility in the shoe. The softness of the material can have a durometer range from 40 Shore A to 100 Shore A, however the preferred reading would be would be 70 Shore A. The perimeter locking strip is preferably made of a high density polyethylene provided for a more stiff connection between the shoe parts. In a preferred embodiment, this material should have a durometer of 40-60. In a preferred embodiment, the locking plug is made of foam or straw material or any recyclable material provides a cushioning and shock absorption between the foot and the ground. The locking plug can be clear for a more stylish look of the shoe or can be colored to blend in with the shoe.

These embodiments incorporate locking protrusions 68 and 1091 and mechanical features 25, 1025 and 65, 1065 to allow for a snap-fit. This process allows for customization options at the retailer. For example, a set of textile portions 50 and 1050, outsoles 20 and 1020 and footbeds, 40 and 1040 can be pre-made and assembled in the customer's chosen scheme via a quick snap-fit.

Figure 19:
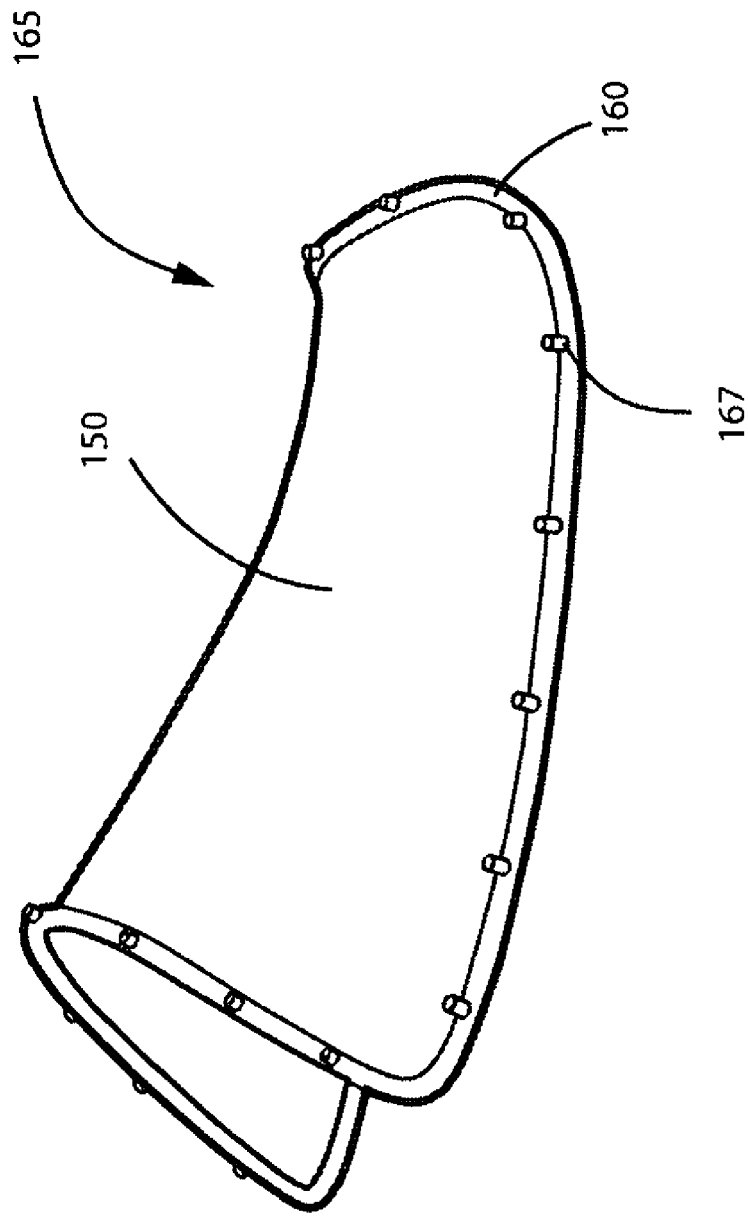
FIG. 19 is a perspective view of a premolded toe portion of the shoe according to the embodiment shown in FIG. 16.
Figure 20:
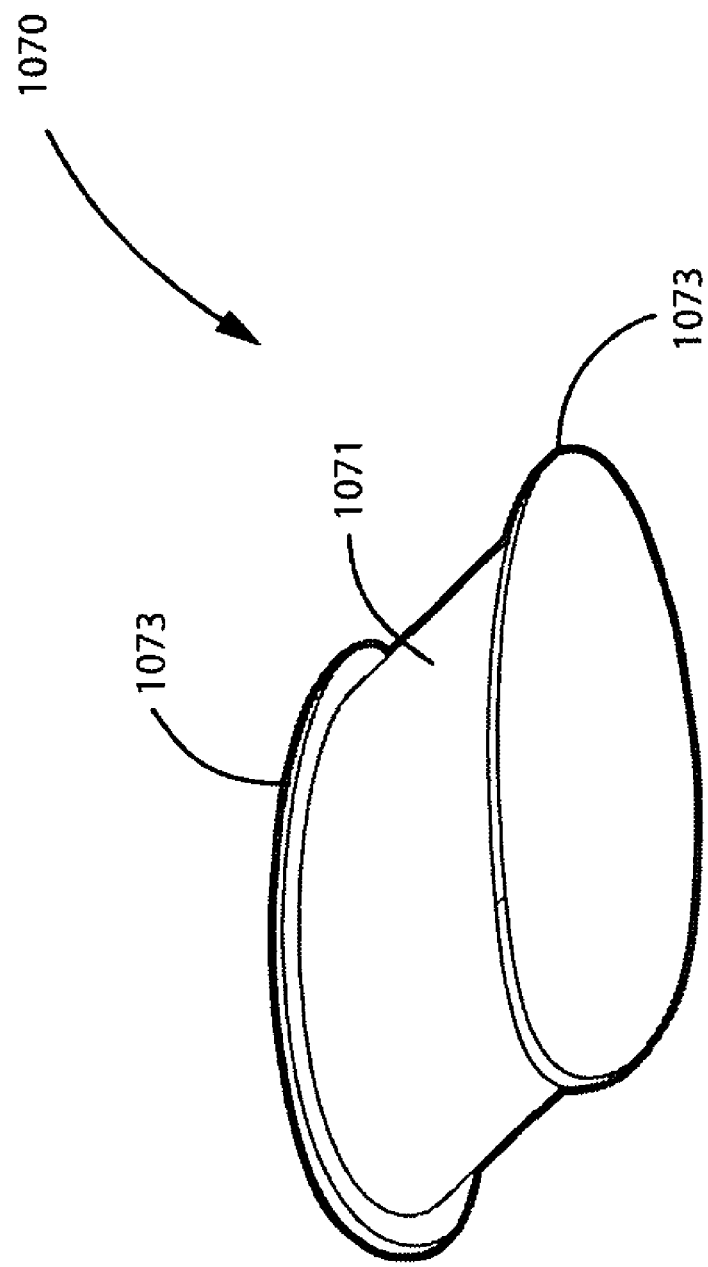
FIG. 20 is a perspective view of a locking plug for the shoe according to the embodiment shown in FIG. 16.
Figure 21:
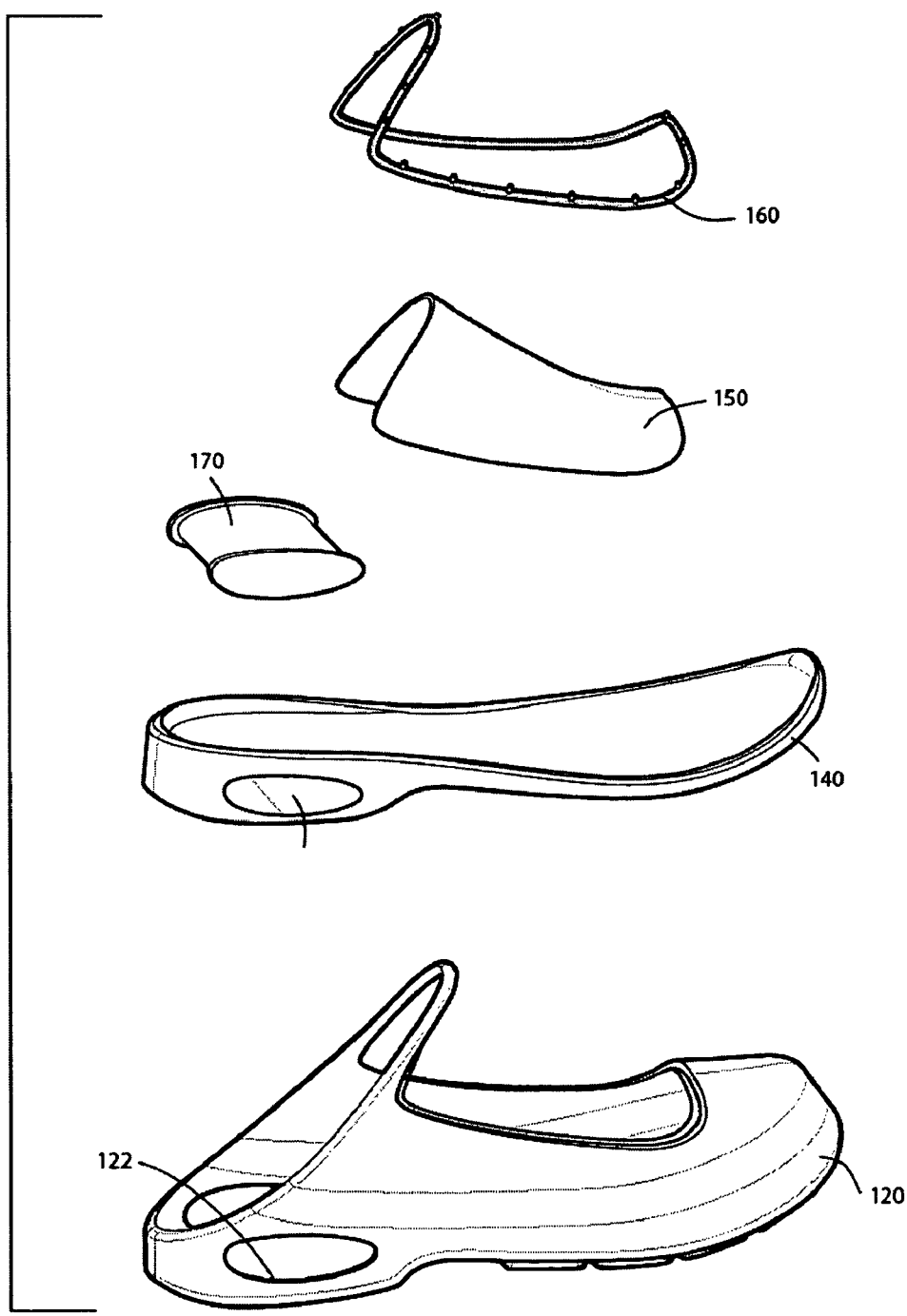
FIG. 21 is an exploded perspective view of the construction of the shoe According to the embodiment shown in FIG. 16.
Figure 22:
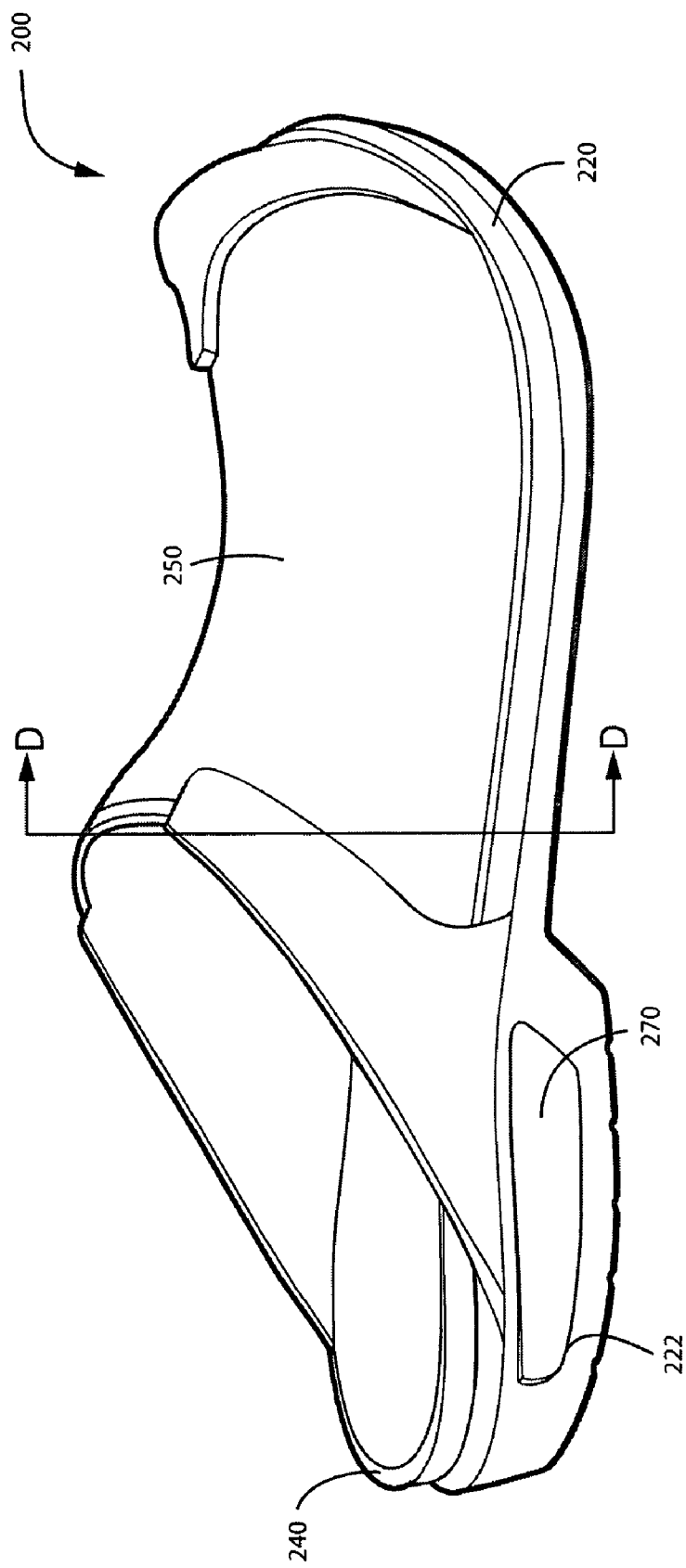
FIG. 22 is a perspective view of the an assembled shoe according to Another embodiment of the present invention.
Figure 23:
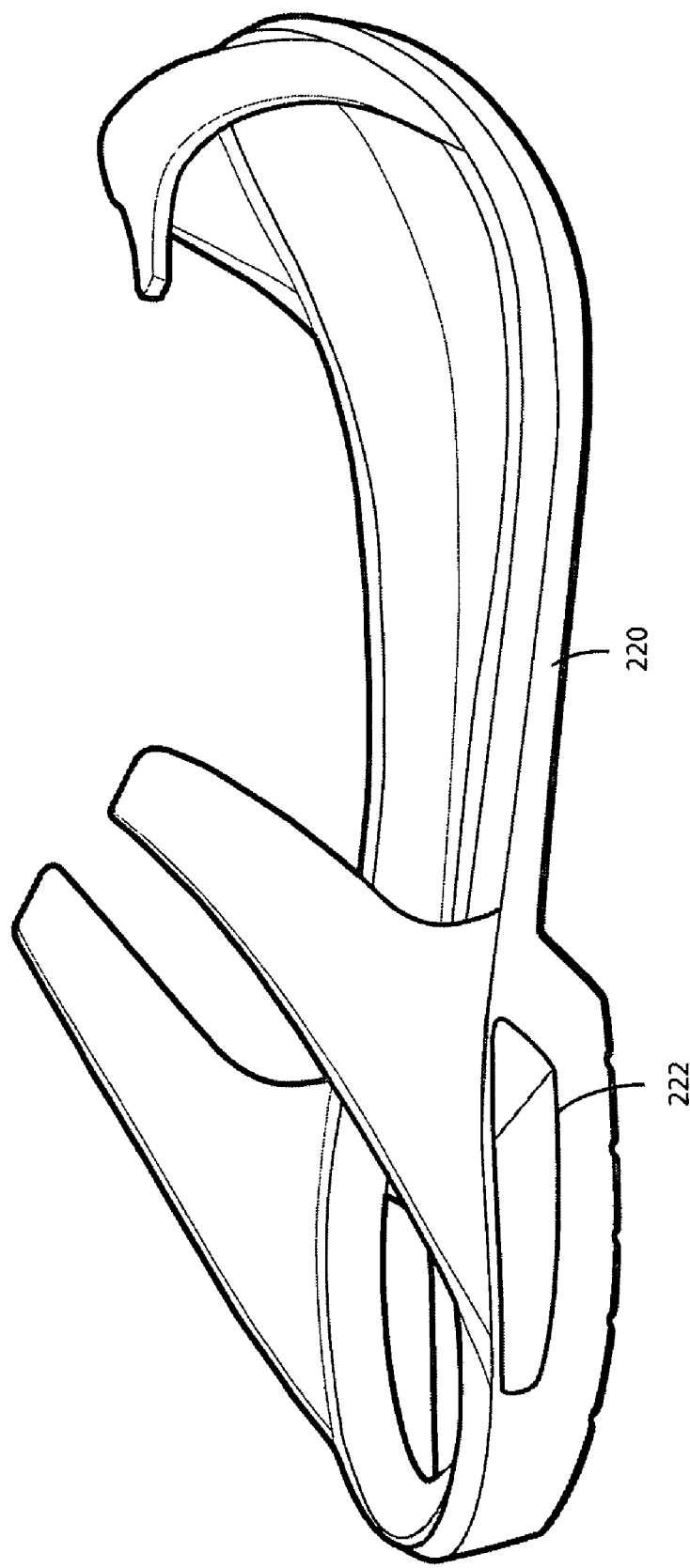
FIG. 23 is a perspective view of outsole portion of the shoe according to the embodiment shown in FIG. 22.
Figure 24:
FIG. 24 is a perspective view of a footbed insert of the shoe according to the embodiment shown in FIG. 22.
Figure 45:
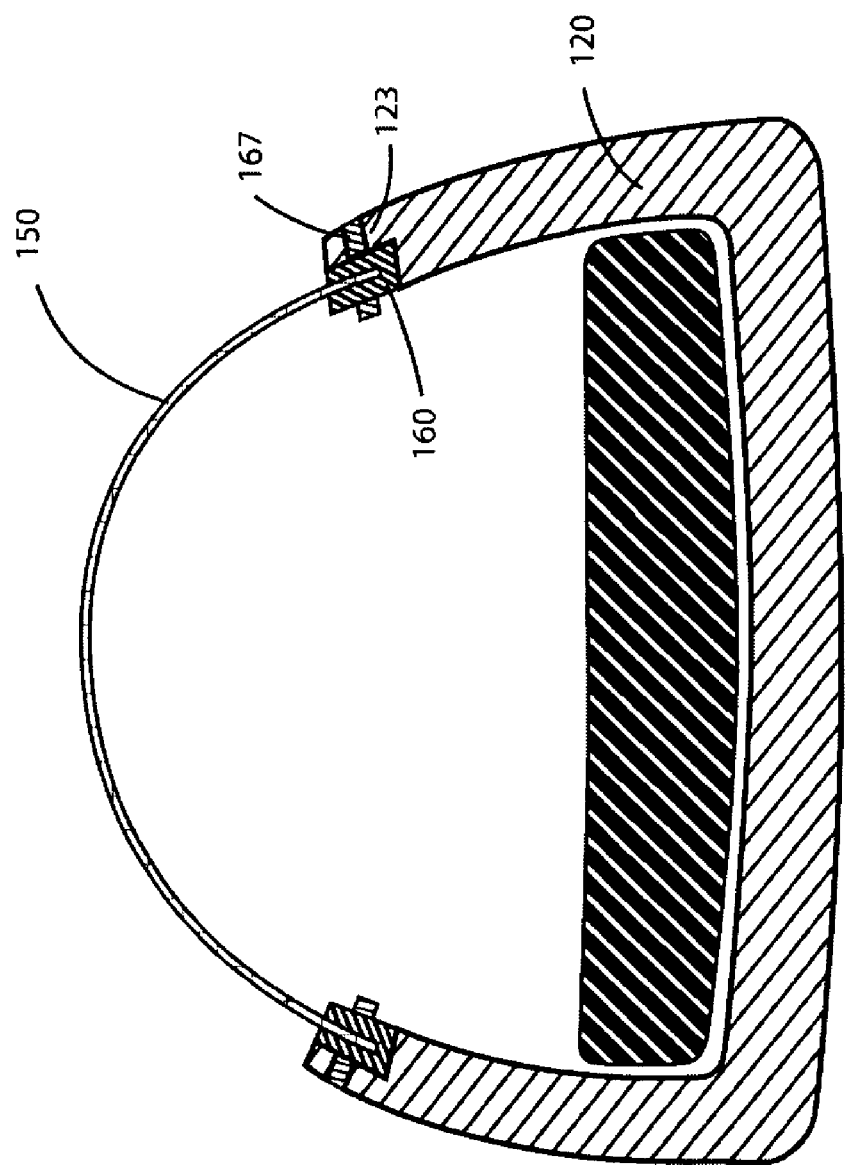
FIG. 45 is a cross sectional view of the textile attachment to the outsole along the lines C-C of FIG. 16.

Reference is next made to FIGS. 16-21 wherein a shoe 100 in accordance with another embodiment is shown having an outsole portion 120 and a footbed insert 140 for insertion into molded outsole 120. Outsole 120 and footbed insert 140 contain two heel openings 122 and 142, respectively. Outsole 120 also contains a series of receiving openings 123 disposed around the inside top perimeter of the shoe 100. Footbed insert 140 has an inner foot supporting surface 143 and a rim 144 extending around the perimeter of surface 143. When placed together, the heel openings of the outsole 132 and the footbed 142 align to form an open channel across the heel of the shoe 100. A textile material 150 is attached to a perimeter textile frame 160 to form a premolded toe portion 165. Textile 150 is laid flat into and attached to textile frame 160 forming the premolded toe portion 165 (FIG. 19). In a preferred embodiment, the textile frame 160 is attached to outsole 120 via pin-like structures 167 that extend through textile frame 160 as shown in FIGS. 19 and 45. As shown in FIG. 45 These pin-like structures 167 are inserted into receiving holes 123 of outsole 120 and the melded together for further support. Premolded toe portion 165 is then attached to outsole 120 via use of the pin-like structures as shown in cross section in FIG. 45. A second molding process joins the premolded toe portion 165 with the outsole. A locking plug 170 is used to lock the outsole 120 and foot bed insert 140 together when it is inserted through heel openings 122 and 142. The locking plug 170 is generally oval in shape and central portion 1071 and flanges 173 as in the earlier embodiments.

The advantage of this process is that it provides more flexibility for using different textiles without having to modify the expensive mold each time since the premolded portions can be easily changed to fit one's style or taste. By creating pin-like features on the perimeter strip mold, the textile portion is efficiently secured to the shoe. The pin-like attachment also allows for the textile portions to be more fully wrapped around the shoe and not be constrained to areas that naturally lie flat due to gravity.

Figure 25:
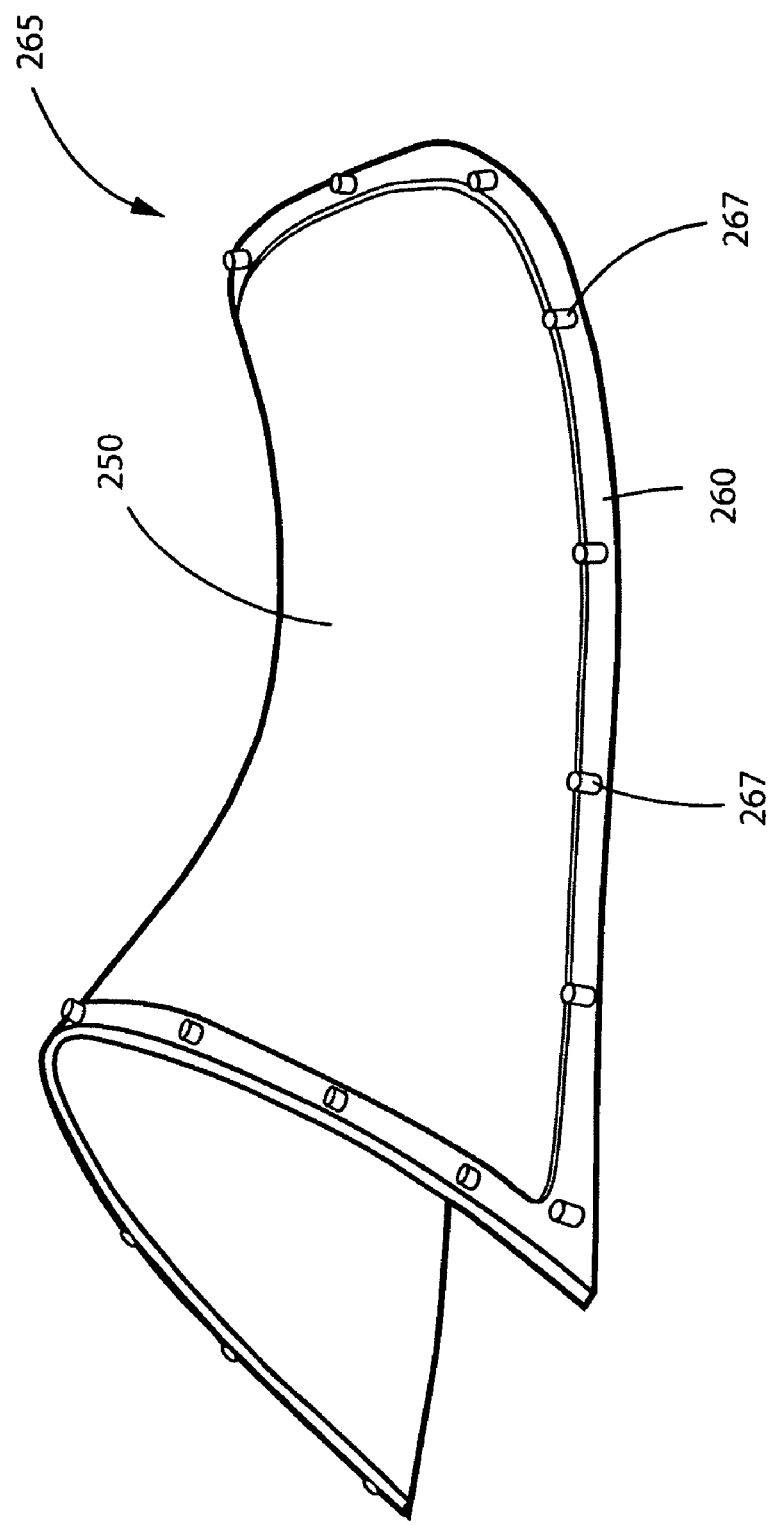
FIG. 25 is a perspective view of a premolded to portion of the shoe according to the embodiment shown in FIG. 22.
Figure 26:
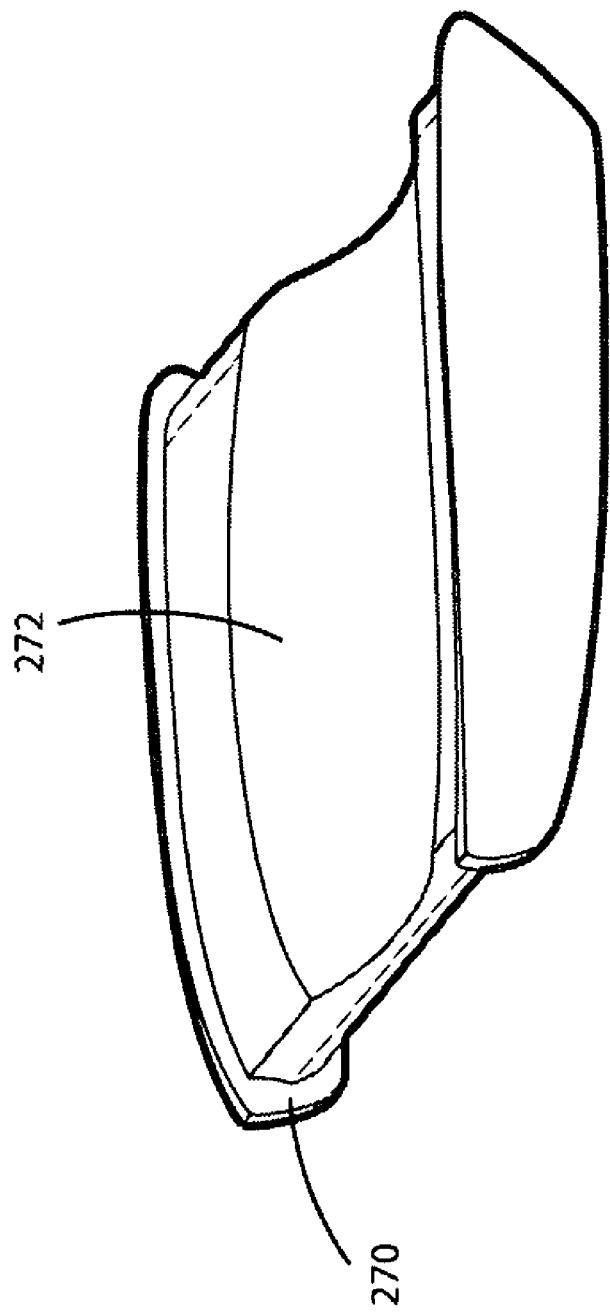
FIG. 26 is a perspective view of a locking plug for the shoe according to the embodiment shown in FIG. 22.
Figure 27:
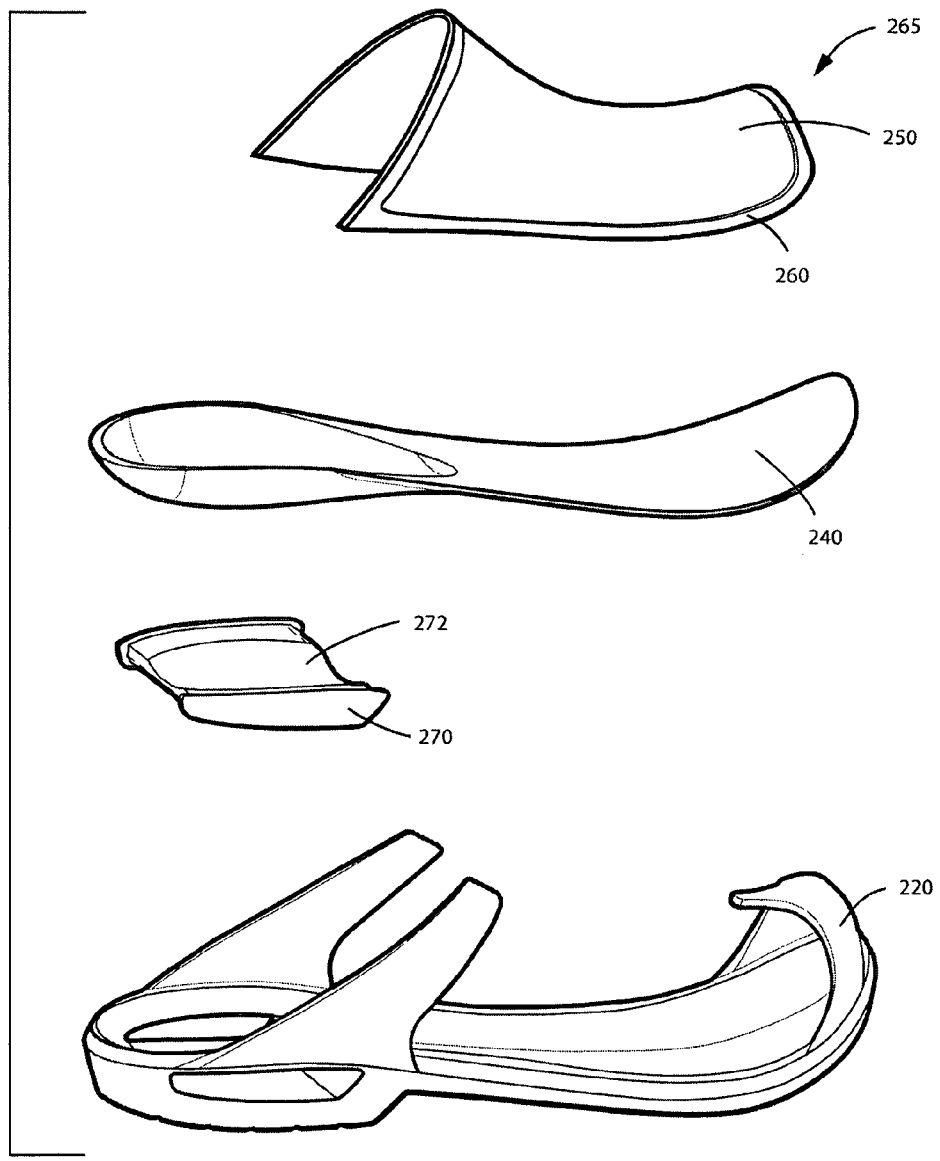
FIG. 27 is an exploded perspective view of the construction of the shoe According to the embodiment shown in FIG. 22.
Figure 46:
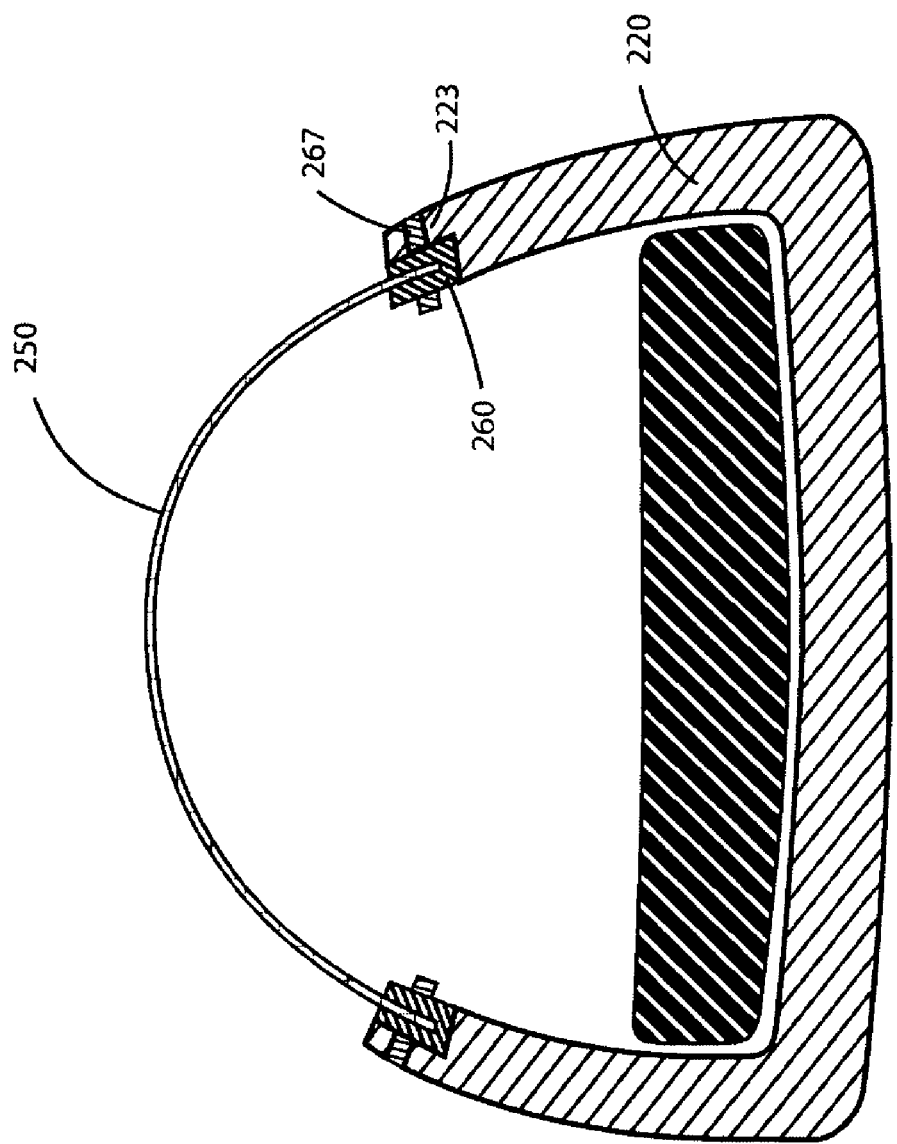
FIG. 46 is a cross sectional view of the textile attachment to the outsole along the lines D-D of FIG. 22.

In another embodiment, FIGS. 22-27 show a shoe 200 having an outsole portion 220 and a footbed insert 240 for inserting into molded outsole 220. Outsole portion 220 contains two heel openings 222. Footbed insert 240 has a raised portion 244 at the heel end for locking the footbed to the outsole and provides a heel cup to hold the wearer's foot in place. A textile material 250 makes the top portion on the shoe. A perimeter textile frame 260 is formed and is attached to textile 250 to form a premolded toe portion 265. Textile 250 is laid flat into and attached to textile frame 260 and textile frame 260 forming the premolded toe portion which is then attached to outsole 220. Textile frame 260 is attached to outsole 220 via pin-like structures 267 that extend through textile frame 260 as shown in FIGS. 25 and 46. As shown in FIG. 46 These pin-like structures 267 are inserted into receiving holes 223 of outsole 220 and the melded together for further support. A locking plug 270 locks outsole 220, with the premolded toe portion 265 already attached, and foot bed insert 240 together. Locking plug 270 contains canyon 272 sized to receive to bottom heel of footbed 240. When locking plug 270 is inserted into outsole portion 220 the connection of the footbed insert 240 locks the two pieces together to prevent slipping by the engagement of the bottom of the heel portion of footbed insert 240 and canyon 272.

Figure 28:
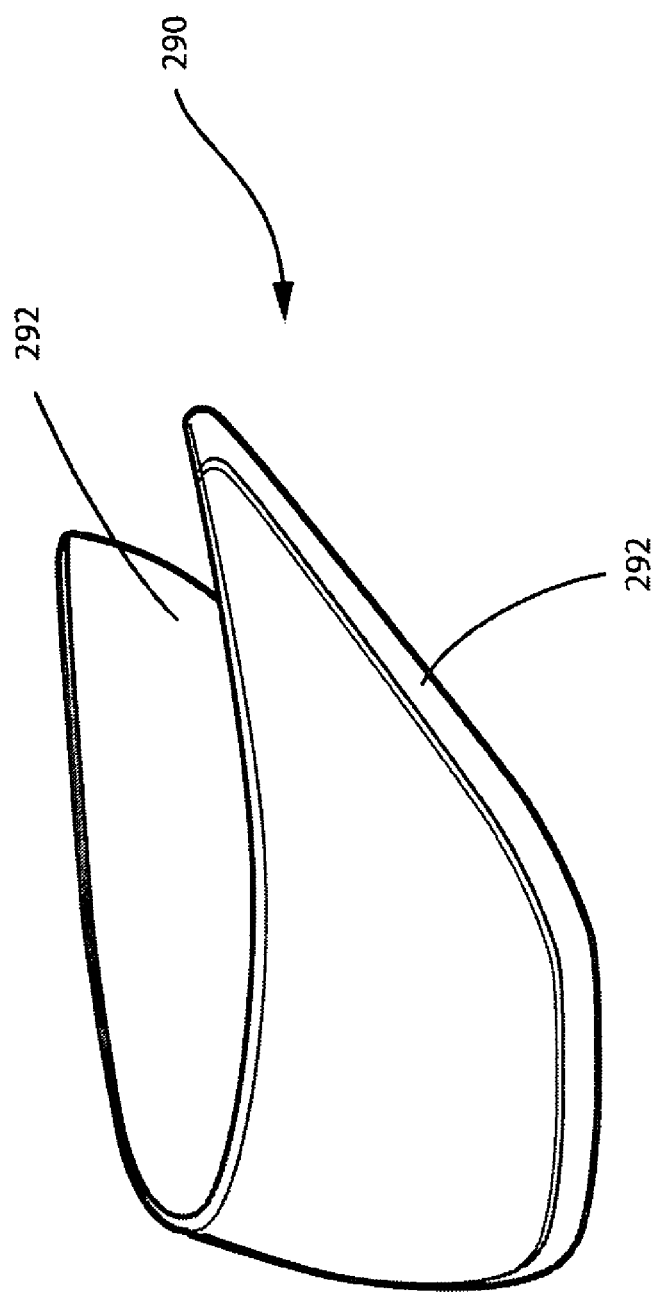
FIG. 28 is a perspective view of a premolded heel portion of the shoe according to the embodiment shown in FIG. 22.
Figure 29:
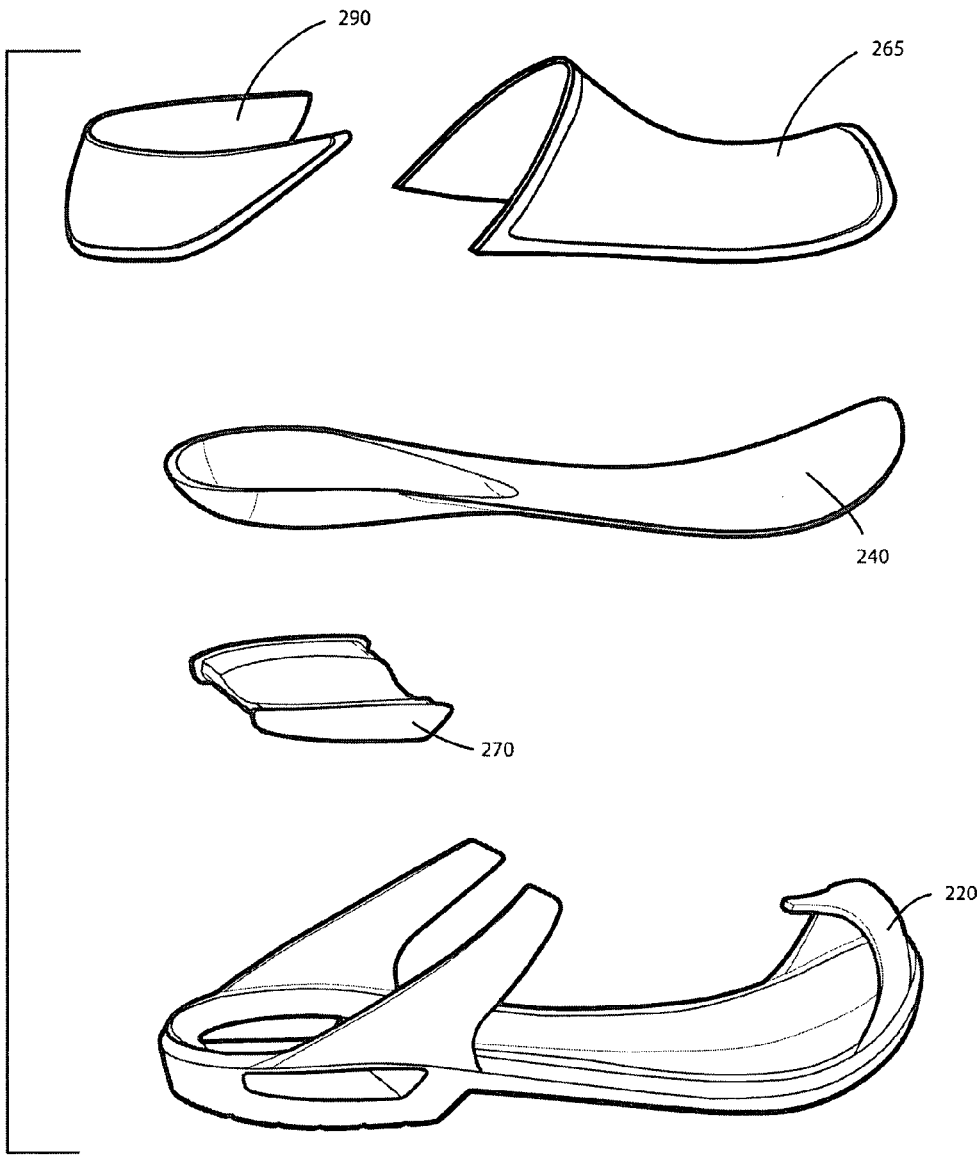
FIG. 29 is an exploded perspective view of the premolded heel portion being attached to the shoe according to the embodiment shown in FIG. 22.
Figure 30:
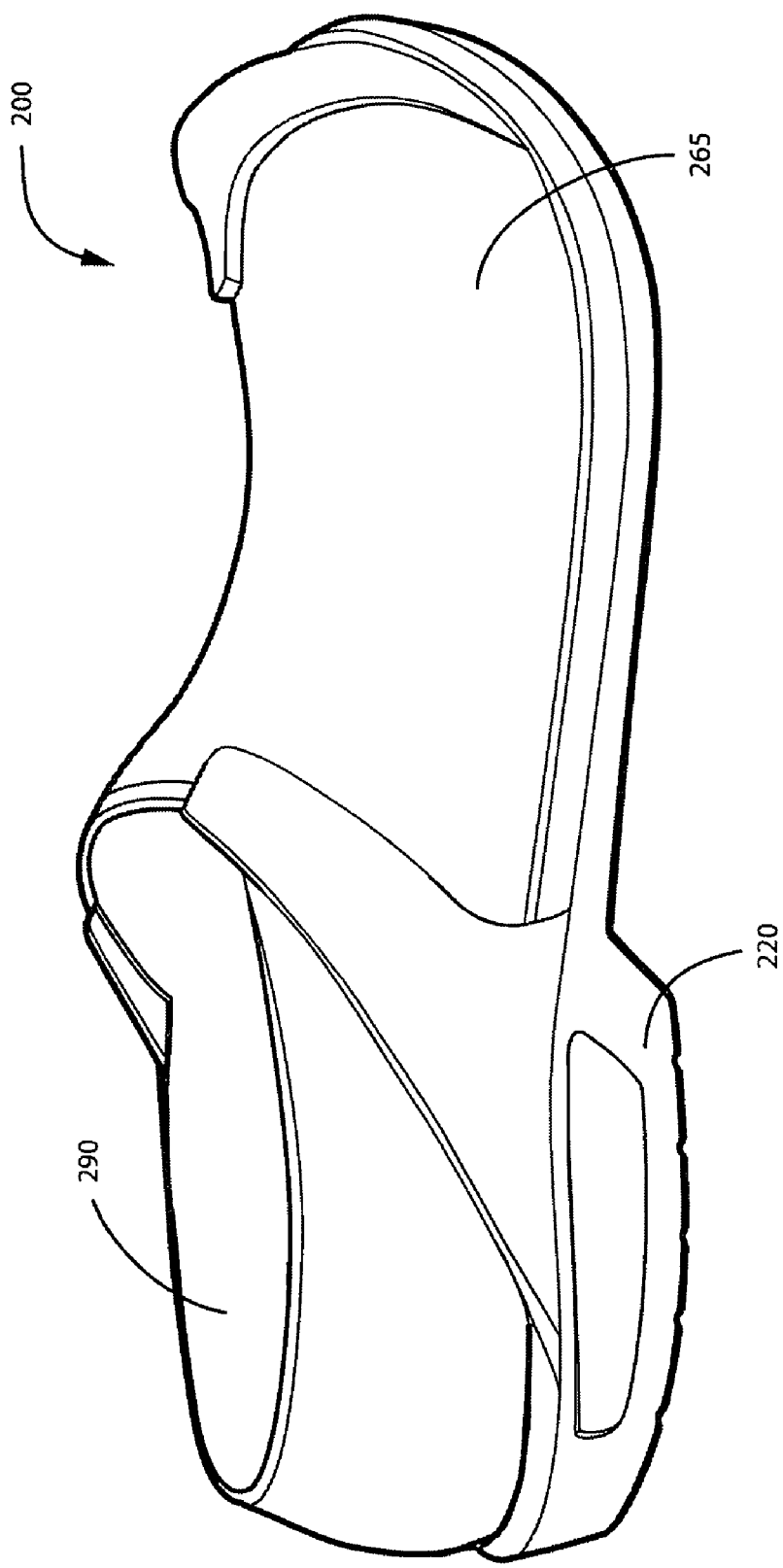
FIG. 30 is a perspective view of a completed shoe including the premolded heel portion of the embodiment of FIG. 22.
Figure 31:
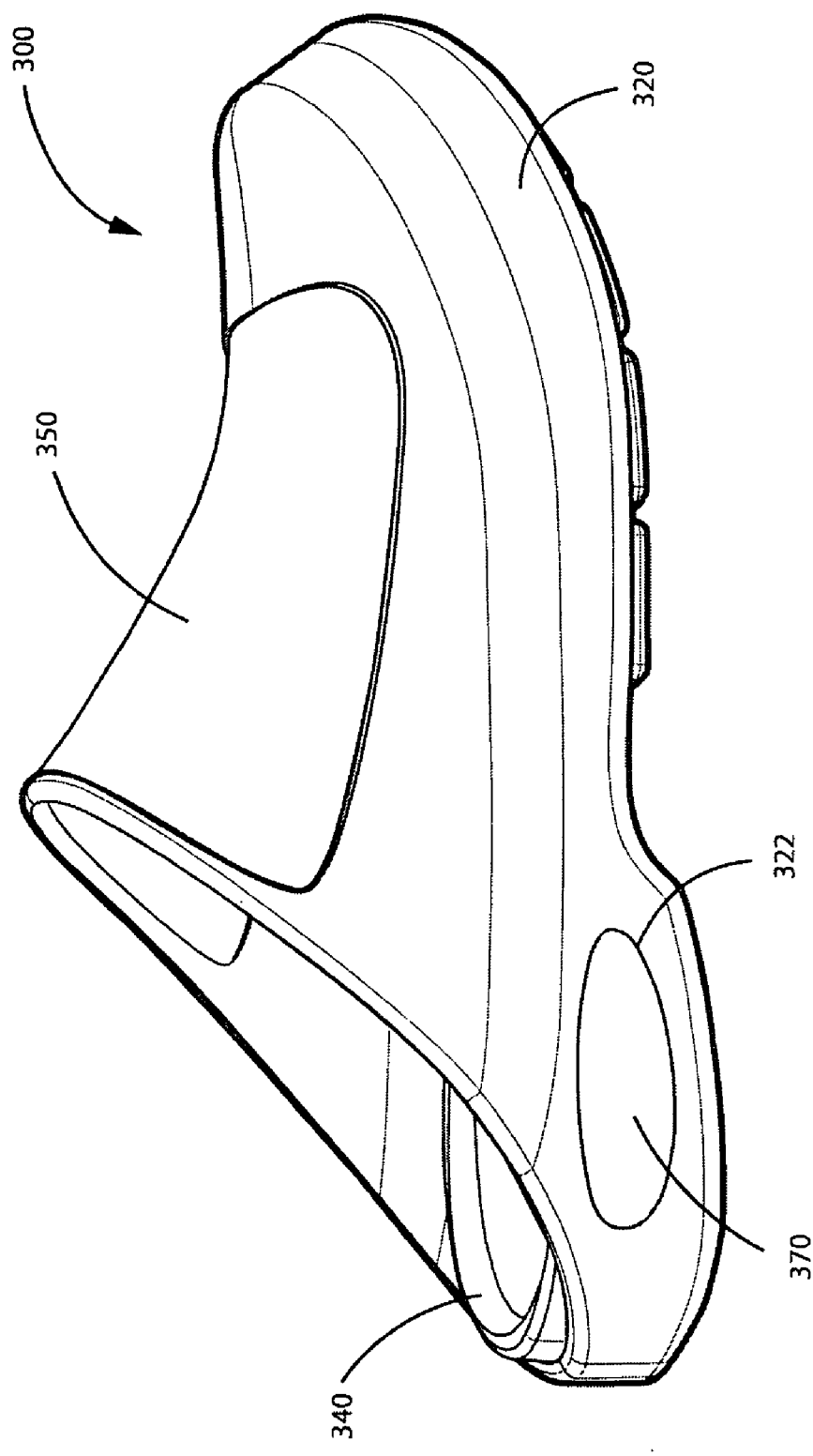
FIG. 31 is a perspective view of the an assembled shoe according to another embodiment of the present invention
Figure 32:
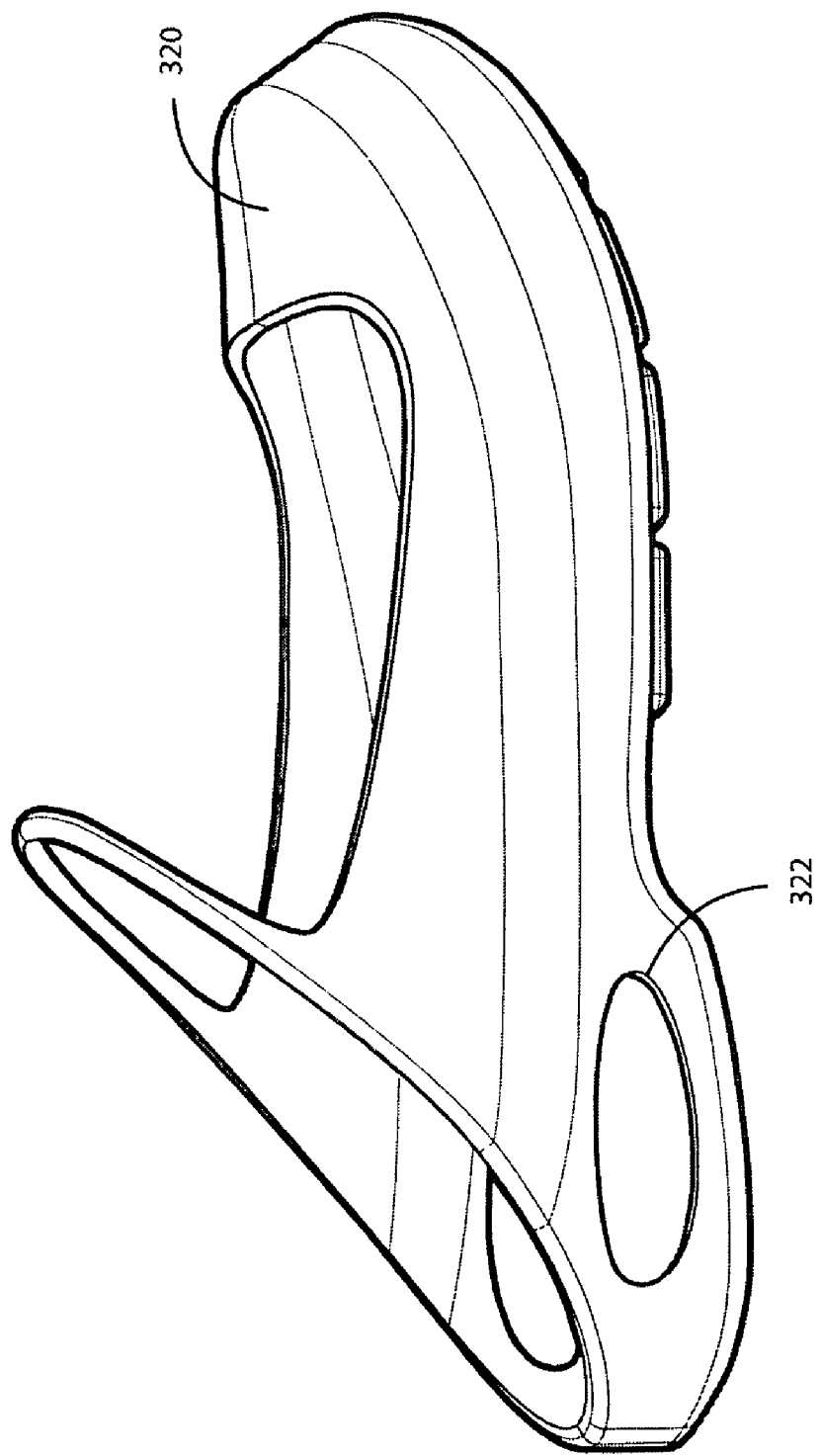
FIG. 32 is a perspective view of an outsole portion of the shoe according to the embodiment shown in FIG. 31.
Figure 33:
FIG. 33 is a perspective view of a footbed insert of the shoe according to the embodiment shown in FIG. 31.
Figure 34:
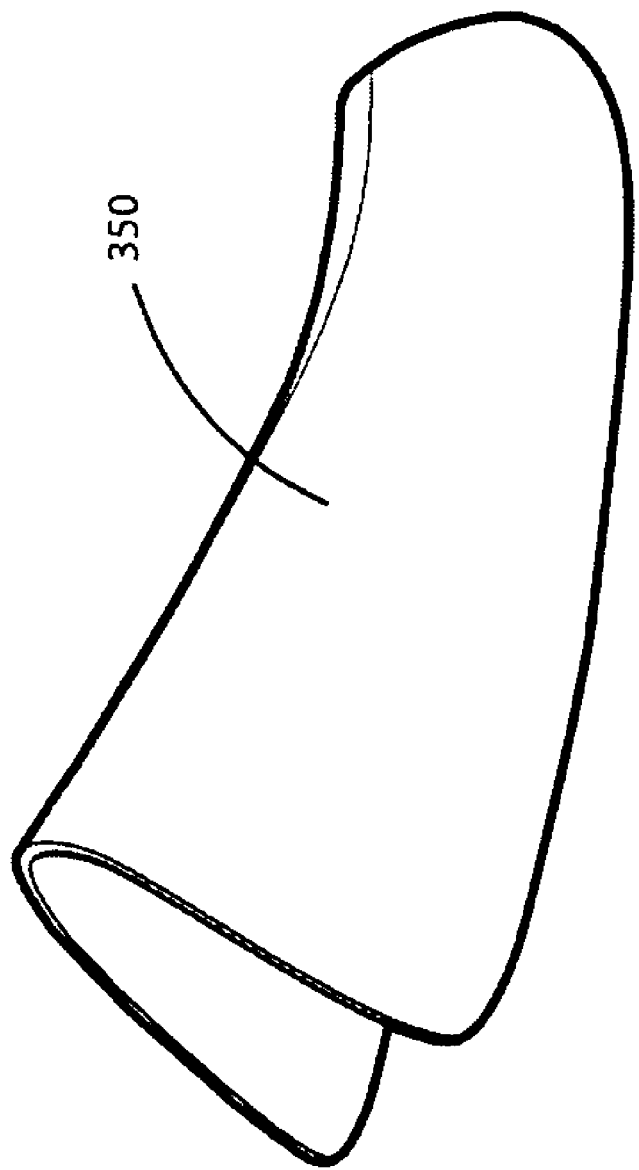
FIG. 34 is a perspective view of a textile portion of the shoe according to the embodiment shown in FIG. 31.
Figure 35:
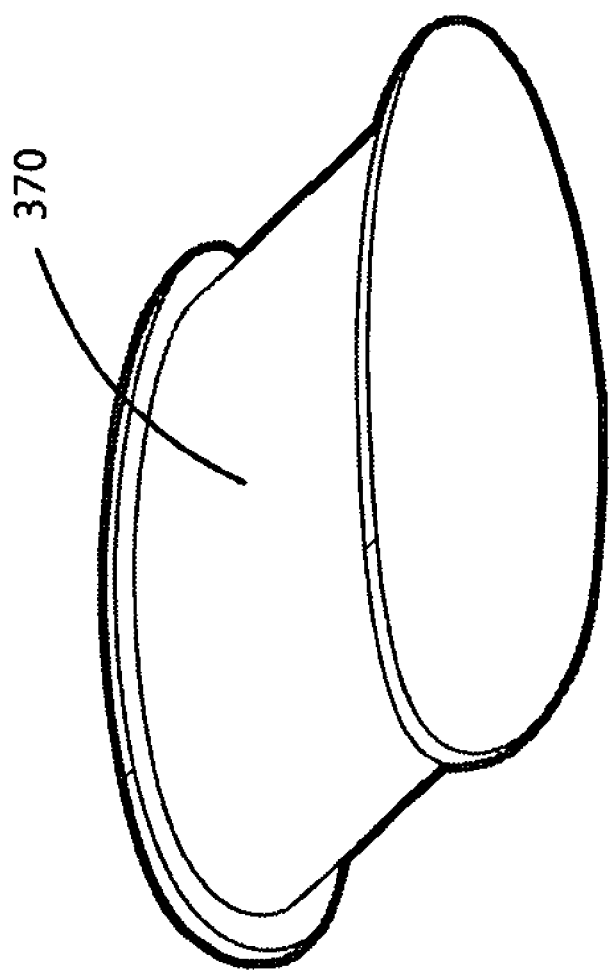
FIG. 35 is a perspective view of a locking plug for the shoe according to the embodiment shown in FIG. 31.
Figure 36:
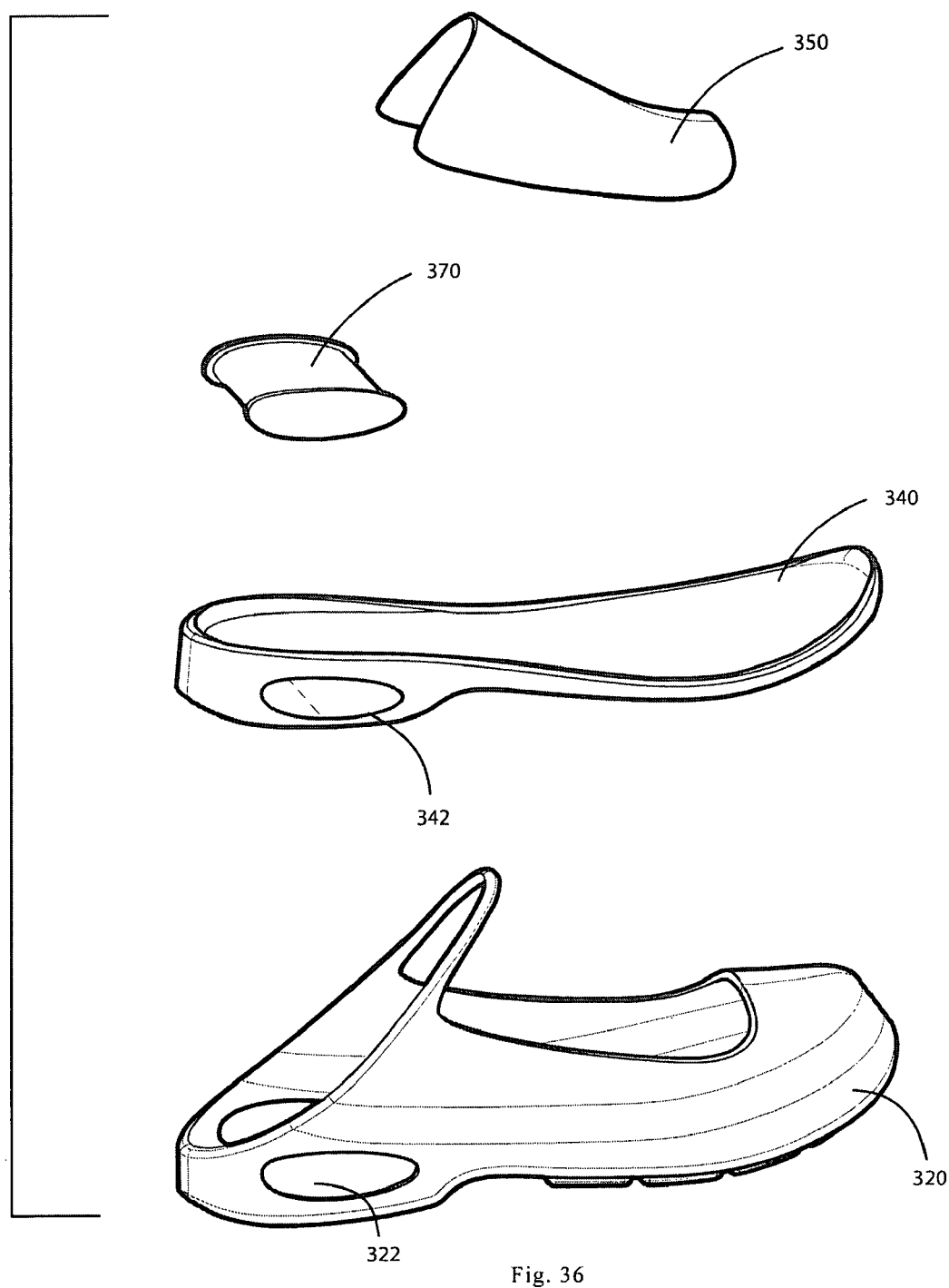
FIG. 36 is an exploded perspective view of the construction of the shoe According to the embodiment shown in FIG. 31.

As shown in FIGS. 28-30, a premolded heel portion 290 can be included and attached to the outsole as a modification to the embodiment of FIGS. 21-27. Similar construction to that of premolded toe portion 265 is sued. Premolded heel portion 290 consists of a textile material 291 and a textile frame 292. Premolded heel portion 290 is then attached to the rest of the shoe as shown in FIGS. 29 and 30.

Reference is next made to FIGS. 31-36 wherein a shoe 300 in accordance with another embodiment of the invention has an outsole portion 320 and a footbed insert 340 for inserting into molded outsole 320. Outsole 320 and footbed insert 340 both contain a heel opening 322 and 342, respectively. A textile material 350 makes the top portion on the shoe and is attached to outsole 320 by molding. A locking plug 370 locks outsole 320 and foot bed insert 340 together.

In a further embodiment shown in FIGS. 37-41 shoe 400 contains a chassis portion 410, an upper fabric textile portion 440, a footbed insert 450, a lasting board portion 460, a front and back midsole 470 and an outsole 480. Chassis 410 is molded by a simple process, using no sliders, and can be mass produced. In a preferred embodiment, chassis 420 is made from a polyurethane material. Upper fabric portion 440 is made from a recycled material. The customer can choose the pattern and style of such material. Footbed 450 is preferably made of a resilient material and provides a lining for the foot. Lasting board portion 460 provides structure and continuity to the shoe. Midsole 470 which may be made of foam or straw material or any recyclable material provides a cushioning and shock absorption between the foot and the ground. In a preferred embodiment, midsole 470 is made of a recyclable resilient material. Outsole 480 is preferably a non-marking polyurethane material.

Midsole 470 can include a paraffin or other phase change material or low melting point material which will act to modulate the heat retention of the shoe. As the temperature increases the material absorbs the heat, in the case of paraffin by melting into the liquid state and, as the temperature again lowers within the shoe the paraffin gives up the heat and returns to the solid state, heating the shoe. The addition of a straw like material helps provide structure to the paraffin without adding unnecessary weight.

Figure 37:
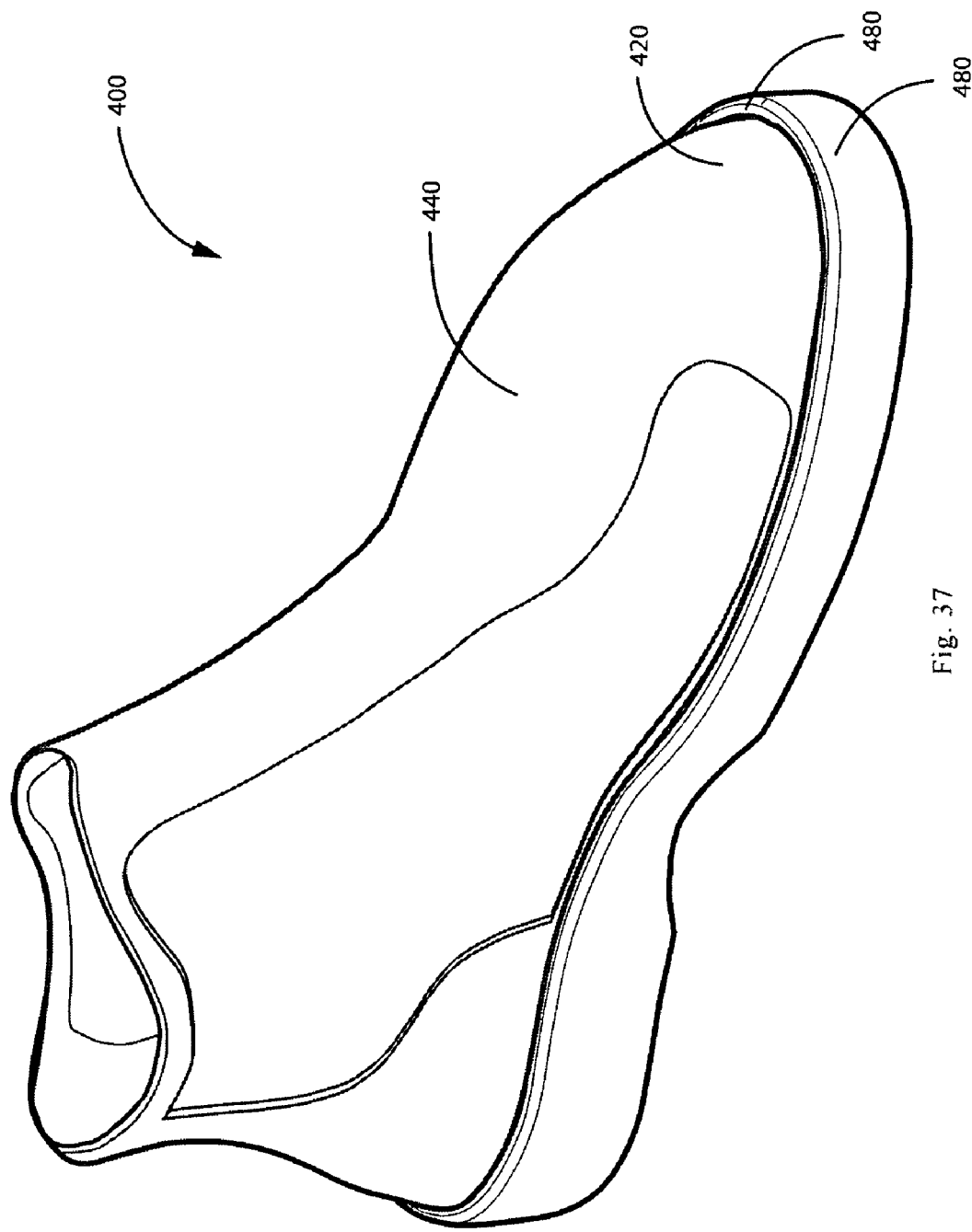
FIG. 37 is a perspective view of a shoe constructed according to another embodiment of the present invention.
Figure 38:
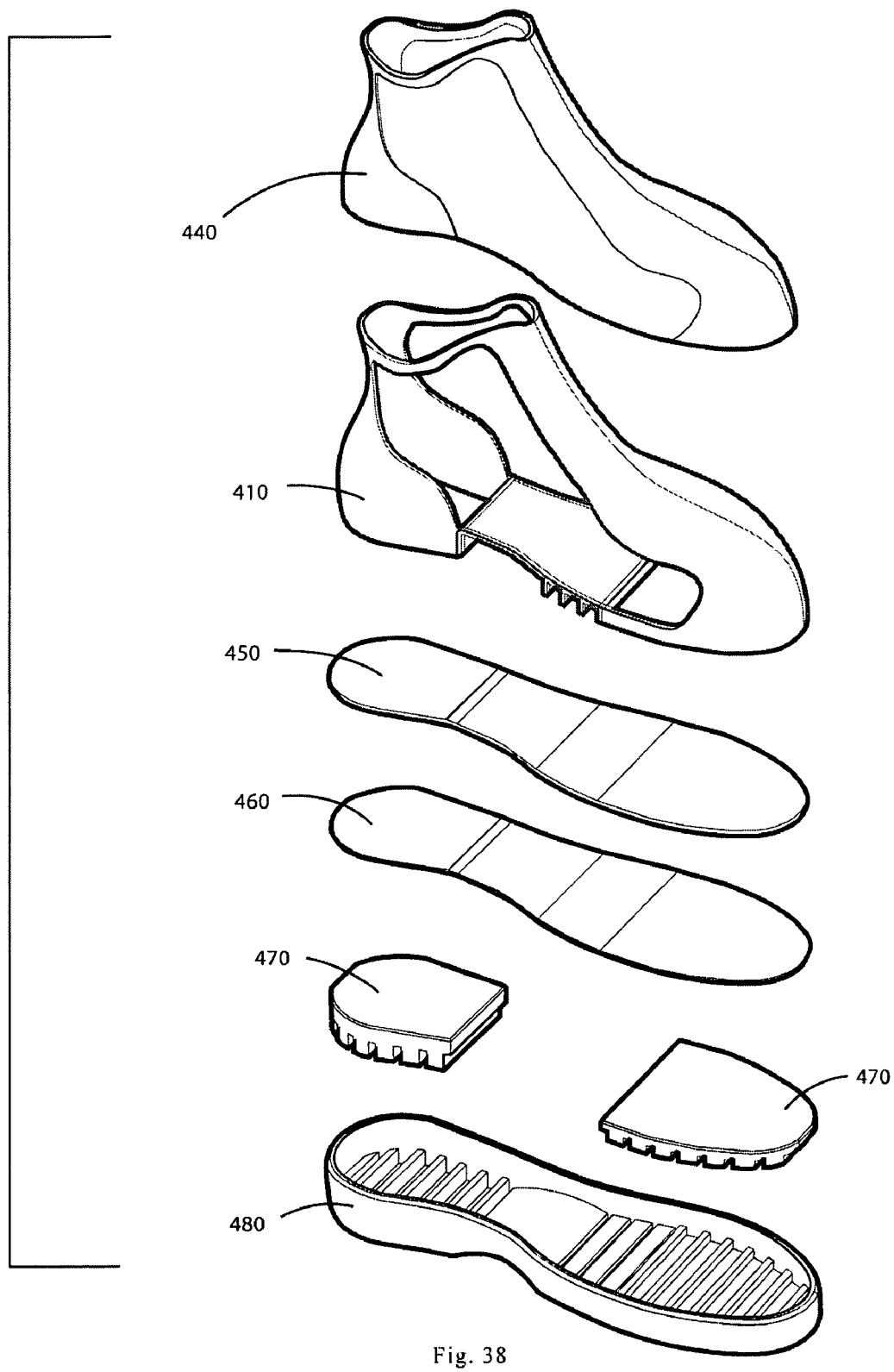
FIG. 38 is an exploded perspective view showing a breakdown of the components of the shoe according to the embodiment of FIG. 37.
Figure 39:
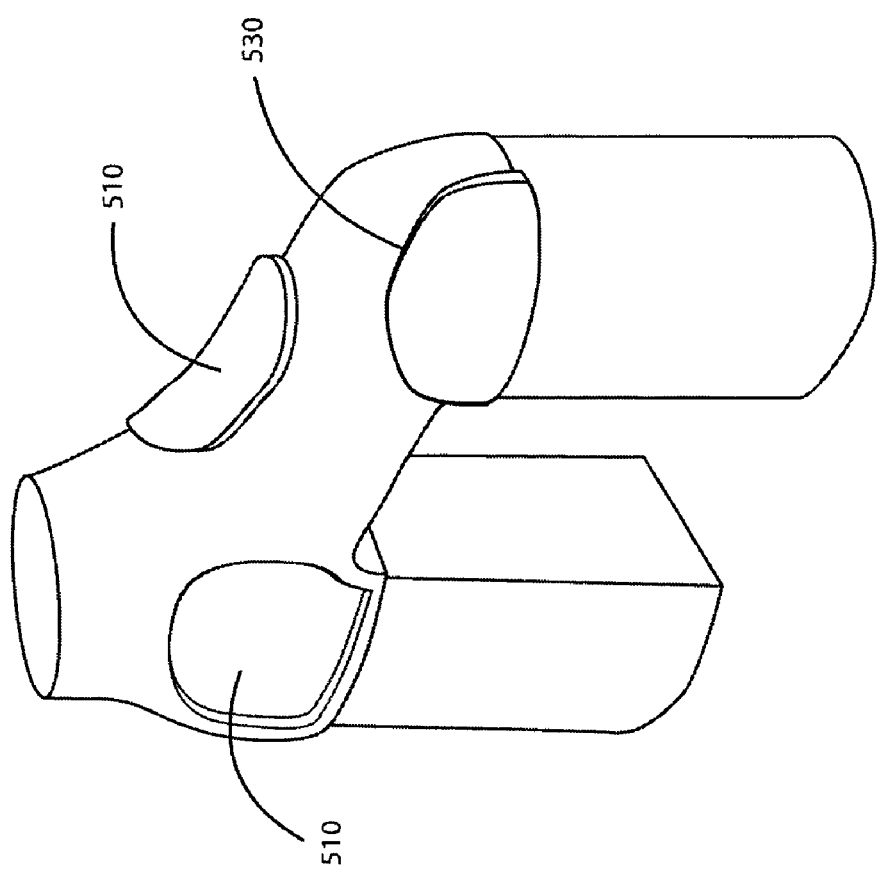
FIG. 39 is a perspective view of a last adjustment device for portions of a custom fit shoe for the shoe according to the embodiment shown in FIG. 37.
Figure 40A:
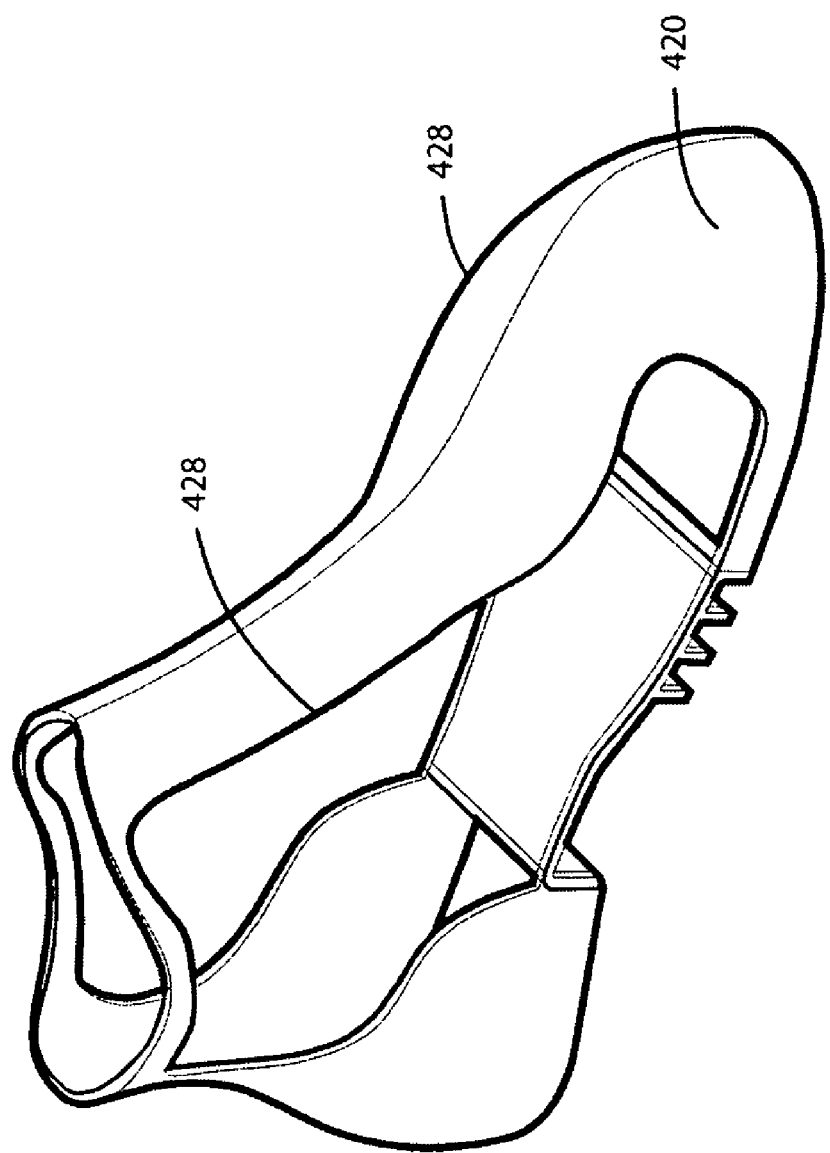
FIG. 40(*a*) is a perspective view of the two man assembly pieces for the shoes of FIG. 37 prior to assembly.
Figure 40B:
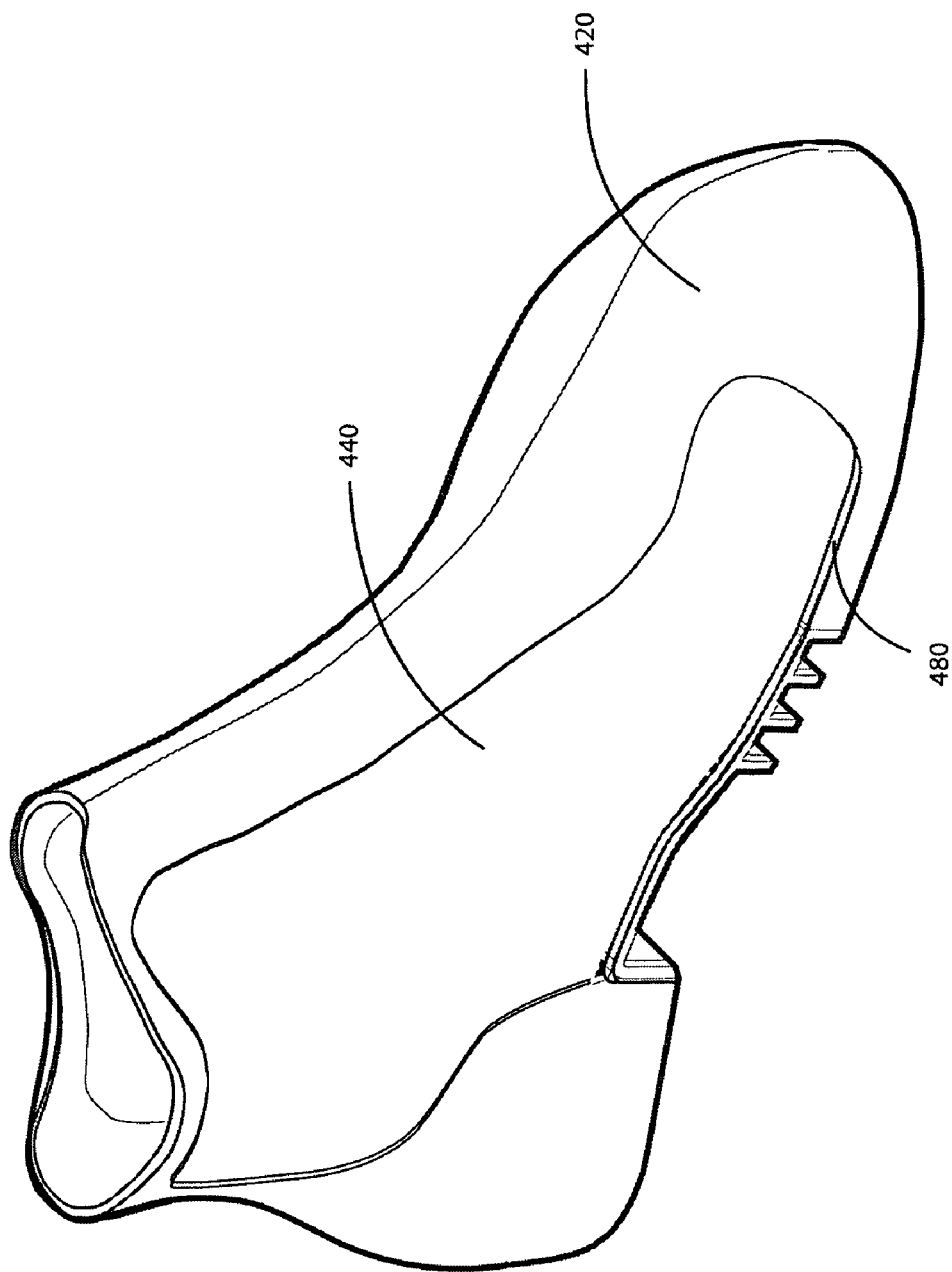

FIG. 37 shows a finished shoe 400 according to a preferred embodiment of the present invention. As can be seen, chassis 410 is securely welded to upper fabric portion 440 and then secured to outsole 480. A cut pattern is laminated with a polyurethane material. This process allows for easier welding to the chassis.

The fabric used for the shoe, depending upon the size of the run or source of the fabric, can either be done as traditionally by clicking from rolls, a more efficient clicking from smaller pieces, which produces less waste, or laser cutting from individual pieces of fabric for a particular shoe. Generally, the fabric is treated in accordance with the invention by a polyurethane sheet lamination, which in some cases may also be tailored to the particular textile or performed with a polyurethane spray application.

Figure 41:
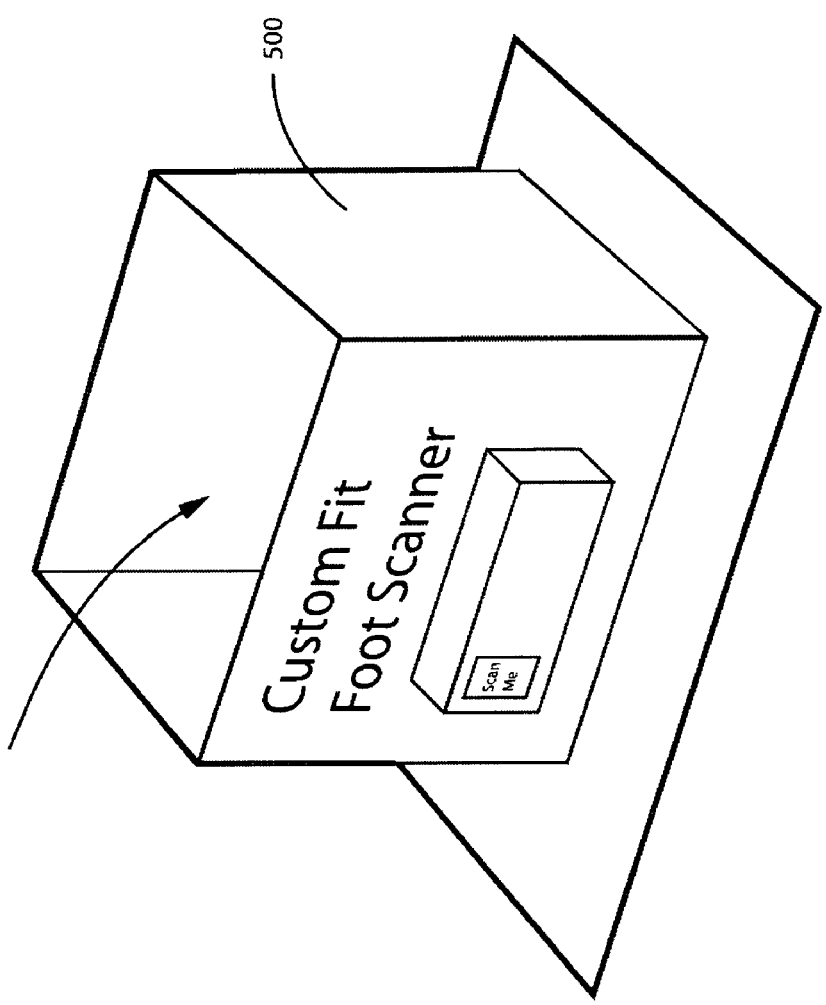
FIG. 41 is a diagrammatic view of a custom fit foot scanner for the shoe according to the embodiment shown in FIG. 37.

FIG. 41 shows a custom foot scanner 500 for customizing shoe 400 according to the present invention. Custom foot scanner 500 takes a three dimensional scan of the wearer's foot so as to provide an appropriate sized shoe to properly fit the customer's feet. Each foot would be separately scanned. Once the customer's foot is scanned, a top arch 510, heel width 520 and toe box 530 of chassis 420 can be adjusted to the proportions of the customer's foot. The scanner uses existing technology to map the contours of the customer's foot into the desired format.

Once chassis 410 has been customized, upper fabric 440 is welded thereto along lines 428 to form the upper shoe portion 410. Chassis 420 is welded to upper fabric portion 440 while heat setting in the custom foot shape.

Upper shoe portion 410, footbed 450, lasting board 460, insert portion 470 and outsole 480 are snapped together. Once these components are securely fixed, upper shoe portion 410 is welded to outsole 480 along line 429.

Creating a shoe according to the present invention allows manufacture without or reduced stitching in the assembly, the shoe is durable and long lasting. The process of the present invention yields less material waste and allows for reuse of some materials. The elimination of the stitching step decreases labor needs and the costs of manufacture. In addition, assembly of the present shoe can be done without the use of adhesives, which can emit toxic chemicals, therefore such manufacture creates less pollution and is therefore environmentally friendly. The welding process of the present invention provides a stronger and more durable bond for holding the shoe together. Further, the shoe can be easily disassembled for recycling or composting of component parts.

The process of creating a customized shoe in accordance with the embodiment of FIGS. 37-41, consists of the following steps: cutting the upper fabric portion, applying a polyurethane laminate to the upper fabric portion, welding the upper fabric portion to the chassis to form the upper shoe portion, snap fitting the upper shoe portion to the footbed, lasting board, foam portion and the outsole portion, then welding the upper shoe portion to the outsole.

It will thus be seen that the objects set forth above, among those made apparent in the preceding description, are efficiently obtained and, since certain changes may be made in the above constructions without departing from the spirit and scope of the invention, it is intended that all matter contained in the above description or shown in the accompanying drawings shall be interpreted as illustrative, and not in a limiting sense.

It is also to be understood that the following claims are intended to cover all of the generic and specific features of the invention, herein described and all statements of the scope of the invention which, as a matter of language, might be said to fall therebetween.

What is claimed is:

1. A molded shoe comprising:

an outsole having a heel end, a toe end and an upper side, the outsole comprising: a series of receiving openings circumferentially disposed around the at least a substantial portion of a perimeter of the outsole; two heel openings located at the heel end of the outsole; and a channel being circumferentially disposed around the upper side;

a footbed insert for insertion into the outsole including a heel opening located to align with the heel openings in the outsole;

a layer of textile having a perimeter;

a perimeter locking means for attaching the layer of textile to the outsole; and a locking plug extending through the heel openings of the outsole and the footbed insert securing the outsole and the footbed insert together.

2. The molded shoe according to claim 1 wherein the perimeter locking means is a perimeter locking strip being similar in shape to outsole and when assembled sits inside the outsole.

3. The molded shoe according to claim 2 wherein the perimeter locking strip comprises a base portion for attaching and two arm portions comprising a longer arm and a shorter arm and a heel opening located a heel end of the perimeter locking mechanism for attaching to the outsole.

4. The molded shoe according to claim 3 wherein the base portion of the perimeter locking strip attaches to the layer of textile.

5. The molded shoe according to claim 4 wherein the arms of the perimeter locking strip attach to the outsole.

6. The molded shoe according to claim 5 wherein the longer arm further comprises a series of perpendicular protrusions aligned for inserting into the receiving openings in the outsole.

7. The molded shoe according to claim 6 wherein the shorter arm comprises a locking ridge for snap fitting to the channel of the outsole.

8. The molded shoe according to claim 5 wherein the perimeter locking strip comprises a series receiving openings disposed circumferentially around the longer arm of the perimeter locking strip that align with the receiving openings of the outsole.

9. The molded shoe according to claim 8 wherein a rivet is inserted into the receiving holes of the perimeter locking strip and the outsole to further secure the shoe.

10. The molded shoe according to claim 8 further comprising a lasting board being disposed in the outsole and comprising a series of protrusions circumferentially disposed around at least a substantial portion of a perimeter of the lasting board arranged to align with the receiving holes of the outsole and the perimeter locking strip for insertion through the receiving openings of the outsole and the perimeter locking strip.

* * * * *